(12) United States Patent
Kimura et al.

(10) Patent No.: US 10,066,087 B2
(45) Date of Patent: Sep. 4, 2018

(54) DISPERSION CONTAINING METAL OXIDE PARTICLES

(71) Applicant: NIPPON SHOKUBAI CO., LTD., Osaka (JP)

(72) Inventors: Junya Kimura, Osaka (JP); Tomoyuki Yao, Osaka (JP); Hironobu Hashimoto, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 14 days.

(21) Appl. No.: 15/113,215

(22) PCT Filed: Jan. 22, 2015

(86) PCT No.: PCT/JP2015/051711
§ 371 (c)(1),
(2) Date: Jul. 21, 2016

(87) PCT Pub. No.: WO2015/111664
PCT Pub. Date: Jul. 30, 2015

(65) Prior Publication Data
US 2017/0009062 A1    Jan. 12, 2017

(30) Foreign Application Priority Data

Jan. 24, 2014    (JP) .............................. 2014-011636

(51) Int. Cl.
*C08K 9/04*    (2006.01)
*C01G 25/02*    (2006.01)
(Continued)

(52) U.S. Cl.
CPC ................ *C08K 9/04* (2013.01); *C01B 13/14* (2013.01); *C01G 25/02* (2013.01); *C08K 9/06* (2013.01);
(Continued)

(58) Field of Classification Search
CPC .... C08K 9/04; C08K 2201/003; C01B 13/14; C01G 25/02
See application file for complete search history.

(56) References Cited

U.S. PATENT DOCUMENTS 4,563,221 A      1/1986  Humphreys
6,646,037 B1 *  11/2003  El-Shoubary ......... C09C 1/3661
                                                       106/417
(Continued)

FOREIGN PATENT DOCUMENTS

JP    59-117559    7/1984
JP    2004-68011   3/2004
(Continued)

OTHER PUBLICATIONS

English machine translation of JP 2013-216858. Obtained from AIPN/JPO website on Sep. 30, 2017.*
(Continued)

*Primary Examiner* — Michael A Salvitti
(74) *Attorney, Agent, or Firm* — Wenderoth, Lind & Ponack, L.L.P.

(57) ABSTRACT

The present invention provides a material that has a good compatibility with monomers and can be used as dispersing agent even after a period of not shorter than one week since the preparation of the dispersion. The dispersion of the present invention comprising metal oxide particles with an average primary particle diameter of not more than 50 nm; an organic acid; a dispersion medium; and an organophosphorus compound represented by formula (1) or an organosulfur compound represented by formula (2).

7 Claims, 1 Drawing Sheet

(51) Int. Cl.
*C01B 13/14* (2006.01)
*C09C 3/08* (2006.01)
*C09C 3/12* (2006.01)
*C09C 1/00* (2006.01)
*C08K 9/06* (2006.01)

(52) U.S. Cl.
CPC .................. *C09C 1/00* (2013.01); *C09C 3/08* (2013.01); *C09C 3/12* (2013.01); C08K 2201/003 (2013.01)

(56) References Cited

U.S. PATENT DOCUMENTS

| | | | | |
|---|---|---|---|---|
| 9,972,757 | B2* | 5/2018 | Kurino | H01L 33/56 |
| 2006/0216508 | A1* | 9/2006 | Denisyuk | B82Y 10/00 |
| | | | | 428/402 |
| 2006/0216510 | A1* | 9/2006 | Denisyuk | B82Y 30/00 |
| | | | | 428/403 |
| 2009/0028792 | A1* | 1/2009 | Schwartz | A61K 41/0057 |
| | | | | 424/9.1 |
| 2010/0019204 | A1* | 1/2010 | Haase | B82Y 30/00 |
| | | | | 252/301.36 |
| 2011/0198113 | A1* | 8/2011 | Hanson | C09D 11/52 |
| | | | | 174/257 |
| 2014/0255459 | A1* | 9/2014 | Martin | C09C 1/3661 |
| | | | | 424/401 |
| 2015/0021643 | A1* | 1/2015 | Kurino | C01G 23/0536 |
| | | | | 257/98 |
| 2015/0252157 | A1* | 9/2015 | Ogura | C08F 265/06 |
| | | | | 427/383.1 |
| 2017/0009062 | A1* | 1/2017 | Kimura | C01G 25/02 |

FOREIGN PATENT DOCUMENTS

| | | | |
|---|---|---|---|
| JP | 2010-85937 | | 4/2010 |
| JP | 2010-95679 | | 4/2010 |
| JP | 2010-513639 | | 4/2010 |
| JP | 201095679 | A * | 4/2010 |
| JP | 2010-159464 | | 7/2010 |
| JP | 2010-189506 | | 9/2010 |
| JP | 2010-195967 | | 9/2010 |
| JP | 5369310 | | 9/2013 |
| JP | 2013-216858 | | 10/2013 |
| JP | 2013216858 | A * | 10/2013 |
| JP | 5435919 | | 12/2013 |

OTHER PUBLICATIONS

English machine translation of JP 2010-95679. Obtained from AIPN/JPO website on Sep. 30, 2017.*
International Search Report dated Apr. 7, 2015 in corresponding International Application No. PCT/JP2015/051711 (with English translation).
Third Party Observation dated Feb. 18, 2016 in corresponding International Application No. PCT/JP2015/051711.
Office Action dated Oct. 3, 2016 in corresponding Taiwanese Application No. 104102206, with English translation.
Notification of Reasons for Rejection dated Dec. 6, 2016 in corresponding Japanese Application No. 2015-559108, with English translation.
Extended European Search Report dated Oct. 16, 2017 in corresponding European Application No. 15740321.3.
Office Action dated Apr. 20, 2018 in corresponding Chinese Patent Application No. 201580005494.5, with English translation.

* cited by examiner

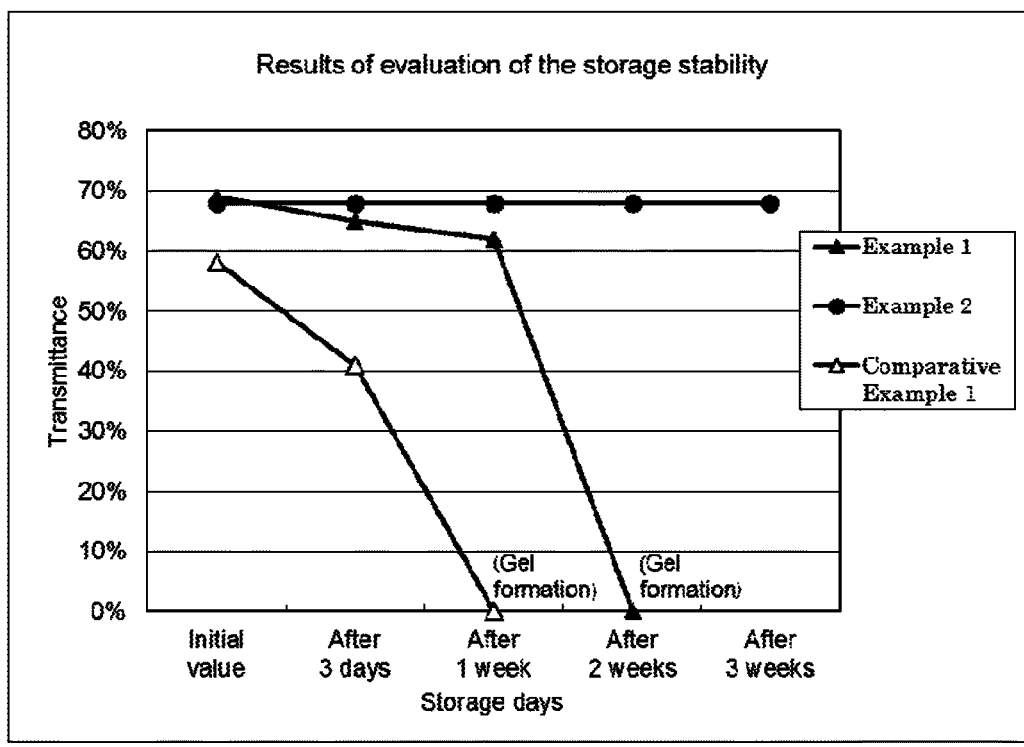

DISPERSION CONTAINING METAL OXIDE PARTICLES

TECHNICAL FIELD

The present invention relates to a dispersion in which metal oxide particles are dispersed in a dispersion medium.

BACKGROUND ART

Metal oxide particles have possibilities that they can impart functions to optical materials, materials for electronic components, and others, and attract attention in the field of various functional materials. However, metal oxides alone, have insufficient dispersibility in organic media, and often result in agglomeration, leading to problems such as a decrease in transparency and mechanical strength. As an example in which these problems have been addressed, Patent Document 1 describes a method for producing a dispersion liquid of inorganic particulates by separately providing zirconium oxide nanoparticles, a dispersing agent (for example, phosphate ester surfactant), a dispersion medium, and finally a silane coupling agent, in order to manufacture a cured material for optical members that has a high degree of transparency and is also heat-stable and superior in resistance to yellowing. In addition, Patent Document 2 describes a method for producing a dispersion liquid of an inorganic oxide having a phosphate ester surfactant added thereto, using an inorganic oxide of which the surface has been modified with a particular silane coupling agent, in order to manufacture a resin composite that is superior in moldability, exhibits transparency, and has a high refractive index.

PRIOR ART DOCUMENT

Patent Documents

Patent Document 1: JP-A-2010-189506
Patent Document 2: JP-A-2010-195967

SUMMARY OF THE INVENTION

Problems to be Solved by the Invention

In usual cases, as described in Patent Documents 1 and 2, when metal oxide particles have been subjected to surface treatment to enhance dispersibility in a dispersion medium, the particles are suspended relatively homogeneously in the dispersion medium shortly after the dispersion has been prepared, so that the dispersion tends to exhibit high transmittance. However, after the dispersion is left as it is for about one week, there is caused a problem that the dispersion liquid results in formation of gel or some of the particles in the dispersion liquid are agglomerated, reducing the transmittance of the dispersion liquid. Thus, it has been difficult to store the dispersion liquid for a long period of time. In addition, even if metal oxide particles have been subjected to surface treatment, the particles may have a poor affinity for a dispersion medium, depending on the kind of dispersion medium (that is, the particles have a poor compatibility with dispersion media). As a result, even in the cases of cured materials to which surface-treated metal oxide particles have been added, there is also caused a problem that the cured material is inferior in transparency.

Under these circumstances, the present invention is aimed at providing a material that has a good compatibility with a variety of dispersion media and is superior in dispersion stability, preferably a material that is in a good state of dispersion even after a period of not shorter than one week since the preparation of the dispersion.

Solutions to the Problems

The present inventors have made intensive studies to solve the above-described problems, found that when an organic acid and an organophosphorus compound and/or organosulfur compound with a particular structure are added before metal oxide particles are dispersed in dispersion media, the metal oxide particles can have a better compatibility with a variety of dispersion media and an improved dispersion stability, and completed the present invention.

That is, a dispersion in the present invention, comprising: metal oxide particles with an average primary particle diameter of not more than 50 nm; an organic acid; a dispersion medium; and an organophosphorus compound, or a salt thereof, represented by formula (1):

[Chemical Formula 1]

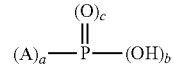

(1)

wherein a and b are each independently 1 or 2, with a+b being equal to 3, and c is 0 or 1;

A denotes a substituent represented by the below-mentioned formula (a1), or a substituent comprising the substituent represented by the below-mentioned formula (a1) and at least one of the linker groups represented by the below-mentioned formulae (a2), wherein when A comprises the linker groups represented by the below-mentioned formulae (a2), the below-mentioned formulae (a2) is bonded to the phosphorus atom via the oxygen atom:

[Chemical Formula 2]

$$R^1-(O)_t- \quad (a1)$$

wherein $R^1$ denotes a saturated or unsaturated hydrocarbon group with 1 to 50 carbon atoms, a (meth)acryloyl group, or an aromatic group-containing hydrocarbon group with 6 to 100 carbon atoms, and t is 0 or 1;

[Chemical Formula 3]

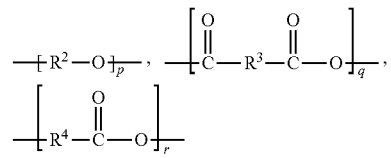

(a2)

wherein $R^2$, $R^3$, and $R^4$ are a divalent hydrocarbon group with 1 to 18 carbon atoms, or a divalent aromatic group-containing hydrocarbon group with 6 to 30 carbon atoms, and a hydrogen atom of each of the $R^2$, $R^3$, and $R^4$ is optionally substituted with an ether group;

p, q, and r each denote an integer molar ratio per mole of the unit (a1), with p+q+r being equal to from 1 to 200, p being equal to from 1 to 200, q being equal to from 1 to 200, and r being equal to from 1 to 200; and/or an organosulfur compound, or a salt thereof, represented by formula (2):

[Chemical Formula 4]

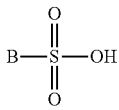
(2)

wherein B denotes a substituent represented by the below-mentioned formula (b1), or a substituent comprising the substituent represented by the below-mentioned formula (b1) and at least one of the linker groups represented by the below-mentioned formulae (b2), wherein when B comprises the linker groups represented by the below-mentioned formulae (b2), the below-mentioned formulae (b2) is bonded to the sulfur atom via the oxygen atom:

[Chemical Formula 5]

(b1)

wherein $R^5$ denotes a saturated or unsaturated hydrocarbon group with 1 to 50 carbon atoms, a (meth)acryloyl group, or an aromatic group-containing hydrocarbon group with 6 to 100 carbon atoms, and t is 0 or 1;

[Chemical Formula 6]

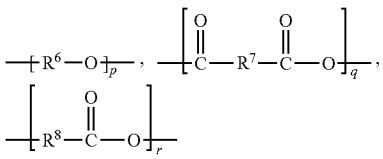
(b2)

wherein $R^6$, $R^7$, and $R^8$ are a divalent hydrocarbon group with 1 to 18 carbon atoms, or a divalent aromatic group-containing hydrocarbon group with 6 to 30 carbon atoms, and a hydrogen atom of each of the $R^6$, $R^7$, and $R^8$ is optionally substituted with an ether group;

p, q, and r each denote an integer molar ratio per mole of the unit (b1), with p+q+r being equal to from 1 to 200, p being equal to from 1 to 200, q being equal to from 1 to 200, and r being equal to from 1 to 200.

It is preferable that the metal oxide particles are coated with at least a part of the organic acid.

It is preferable that the metal of the metal oxide particles is at least one selected from Ti, Al, Zr, Zn, Sn, and Ce. It is also preferable that the organic acid is an organic acid selected from (meth)acrylic acids, or carboxylic acids with one or more substituents selected from the group consisting of an ester group, an ether group, an amido group, a thioester group, a thioether group, a carbonate group, a urethane group, and a urea group. In particular, it is a more preferable embodiment that the organic acid is a half ester of a $C_{3-9}$ aliphatic dicarboxylic acid with a (meth)acryloyloxy $C_{1-6}$ alkyl alcohol. Further, according to a more preferable aspect, the metal oxide particles have been subjected to surface treatment with a silane coupling agent.

Additionally, the present invention includes an article produced by molding or curing the above-mentioned dispersion.

Effects of the Invention

According to the present invention, an organic acid and an organophosphorus compound and/or organosulfur compound with a particular structure are added to metal oxide particles, so that the dispersion thus obtained has a good compatibility with a variety of dispersion media, making it possible that the dispersion is used as a dispersion even after a period of not shorter than one week since the preparation of the dispersion.

BRIEF DESCRIPTION OF THE DRAWING

FIG. 1 shows the results of the evaluation of storage stability performed using metal oxide particles according to the present invention.

MODE FOR CARRYING OUT THE INVENTION

A dispersion according to the present invention is characterized by comprising an organophosphorus compound represented by formula (1) described below and/or an organosulfur compound represented by formula (2) described below. A dispersion that comprises metal oxide particles, an organic acid, and such an organophosphorus compound and/or organosulfur compound results in no formation of gel even after one week since the preparation of the dispersion. This allows the dispersion to be stored for a long period of time, thereby reducing a loss caused in the production of various types of products in which the dispersion is used as a raw material, which is extremely cost-efficient. Also, a dispersion that comprises, as described, metal oxide particles, an organic acid, and an organophosphorus compound and/or organosulfur compound with a particular structure is superior in compatibility with a variety of dispersion media, so that the dispersion has a significantly extended range of applicability compared to conventional ones.

A dispersion according to the present invention comprises an organophosphorus compound and/or organosulfur compound with a particular structure; metal oxide particles with an average primary particle diameter of not more than 50 nm; an organic acid; and a dispersion medium. The following will describe in detail the components making up the dispersion.

<Organophosphorus Compounds and/or Organosulfur Compounds Employed in the Present Invention>

In the present invention, it is believed that by the addition of an organophosphorus compound and/or organosulfur compound to a dispersion, the surfaces of the metal oxide particles are covered with the organophosphorus compound and/or organosulfur compound and the hydroxy groups contained in the organophosphorus compound and/or organosulfur compound improve the dispersibility of the particles and the storage stability of the dispersion comprising the particles, so that the dispersibility of the dispersion comprising the metal oxide particulates is increased.

1) Organophosphorus Compounds Employed in the Present Invention

The organophosphorus compound that is employed in the present invention includes an organophosphorus compound represented by formula (1):

[Chemical Formula 7]

$$(A)_a \!-\! \overset{(O)_c}{\underset{\|}{P}} \!-\! (OH)_b \tag{1}$$

wherein a and b are each independently 1 or 2, with a+b being equal to 3, and c is 0 or 1;

A denotes a substituent represented by the below-mentioned formula (a1), or a substituent comprising the substituent represented by the below-mentioned formula (a1) and at least one of the linker groups represented by the below-mentioned formulae (a2), wherein the order of linkage of the linker groups represented by the below-mentioned formulae (a2) is not limited, and the linker groups may take a block structure in which the same unit is repeated or a random structure in which different units are randomly bonded, and other linker groups may be included if any one or more of the below-mentioned structures are included, and wherein when A comprises at least one of the linker groups represented by formulae (a2), the formulae (a2) is bonded to the phosphorus atom via the oxygen atom:

[Chemical Formula 8]

$R^1-(O)_t-$ (a1)

wherein $R^1$ denotes a saturated or unsaturated hydrocarbon group with 1 to 50 carbon atoms, a (meth)acryloyl group, or an aromatic group-containing hydrocarbon group with 6 to 100 carbon atoms, and t is 0 or 1;

[Chemical Formula 9]

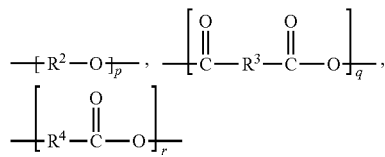

(a2)

wherein $R^2$, $R^3$, and $R^4$ are a divalent hydrocarbon group with 1 to 18 carbon atoms, or a divalent aromatic group-containing hydrocarbon group with 6 to 30 carbon atoms, and a hydrogen atom of each of the $R^2$, $R^3$, and $R^4$ is optionally substituted with an ether group; p, q, and r each denote an integer molar ratio per mole of the unit (a1), with p+q+r being equal to from 1 to 200, p being equal to from 1 to 200, q being equal to from 1 to 200, and r being equal to from 1 to 200.

For the oxo acid part, various types can be listed according to the values of the variables a to c. The present invention preferably uses, as the organophosphorus compound, for example, a phosphoric acid compound or phosphate ester represented by the following formula:

[Chemical Formula 10]

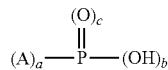

wherein a and b are each independently 1 or 2, with a+b being equal to 3, and A is the same as above; a phosphorous acid compound or phosphite ester represented by the following formula:

[Chemical Formula 11]

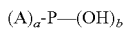

$(A)_a\text{-P}-(OH)_b$ wherein a and b are each independently 1 or 2, with a+b being equal to 3, and A is the same as above; a phosphonic acid compound or phosphonate ester represented by the following formula:

[Chemical Formula 12]

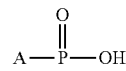

wherein A is the same as above. Among these compounds, the organophosphorus compound preferably is a phosphate ester because the phosphate ester is capable of increasing the storage stability of the dispersion to a greater degree.

Regarding the substituent A, saturated or unsaturated hydrocarbon groups with 1 to 50 carbon atoms for $R^1$ include, for example, linear or branched alkyl groups, such as a methyl group, an ethyl group, a propyl group (an n-propyl group, an iso-propyl group, etc.), a butyl group (an n-butyl group, a tert-butyl group, a sec-butyl group, etc.), a pentyl group (an n-pentyl group, an isopentyl group, a neopentyl group, etc.), a hexyl group (an n-hexyl group, a 2-methylpentyl group, a 3-methylpentyl group, a 2,2-dimethylbutyl group, a 2,3-dimethylbutyl group, etc.), a heptyl group (an n-heptyl group, a 2-methylhexyl group, a 3-methylhexyl group, a 2,2-dimethylpentyl group, a 2,3-dimethylpentyl group, a 2,4-dimethylpentyl group, a 3-ethylpentyl group, a 2,2,3-trimethylbutyl group, etc.), an octyl group (an n-octyl group, a methylheptyl group, a dimethylhexyl group, a 2-ethylhexyl group, a 3-ethylhexyl group, a trimethylpentyl group, a 3-ethyl-2-methylpentyl group, a 2-ethyl-3-methylpentyl group, a 2,2,3,3-tetramethylbutyl group, etc.), a nonyl group (an n-nonyl group, a methyloctyl group, a dimethylheptyl group, a 3-ethylheptyl group, a 4-ethylheptyl group, a trimethylhexyl group, a 3,3-diethylpentyl group, etc.), a decyl group, an isodecyl group, an undecyl group, a dodecyl group, a tridecyl group, a stearyl group, and an isostearyl group; linear or branched alkenyl groups, such as a vinyl group, a propenyl group (an allyl group, a 1-methylvinyl group, etc.), a butenyl group (a 1-butenyl group, a 2-butenyl group, a 3-butenyl group, a 1-methylallyl group, a 2-methylallyl group, etc.), a pentenyl group (a 1,1-dimethylallyl group, etc.), a nonenyl group, a decenyl group, an octadecenyl group, a palmitoleyl group, an oleyl group, a linoyl group, and a linoleyl group. The number of carbon atoms in the hydrocarbon groups is more preferably from 1 to 25, further preferably from 1 to 18, and particularly preferably from 1 to 12. Among the above-illustrated examples, preference is given to linear or branched alkyl groups with 1 to 10 carbon atoms, and linear or branched alkenyl groups with 2 to 4 carbon atoms. Further preference is given to a methyl group, an ethyl group, a propyl group (an n-propyl group, an iso-propyl group, etc.), a butyl group (an n-butyl group, a tert-butyl group, a sec-butyl group, etc.), an octyl group (an n-octyl group, a methylheptyl group, a dimethylhexyl group, a 2-ethylhexyl group, a 3-ethylhexyl group, etc.), a decyl group, a vinyl group, a propenyl group (an allyl group, a 1-methylvinyl group, etc.), a butenyl group (a 1-methylallyl group, a 2-methylallyl group, etc.). Most preference is given to a methyl group, an ethyl group, an octyl group, a decyl group, and a 1-methylvinyl group.

In addition, a hydrogen atom of the saturated or unsaturated hydrocarbon groups with 1 to 50 carbon atoms may be substituted with an aromatic group-containing hydrocarbon group with 6 to 100 carbon atoms described below. The aromatic group-containing hydrocarbon group with 6 to 100 carbon atoms that can be used as a substituent on the saturated or unsaturated hydrocarbon groups is, for example, preferably a phenyl group and a naphthyl group, and more preferably a phenyl group. Saturated or unsaturated hydrocarbon groups with 1 to 50 carbon atoms that are substituted with an aromatic group-containing hydrocarbon group with 6 to 100 carbon atoms include, for example, substituents as described below, wherein * indicates the site of attachment to the adjacent oxygen atom.

[Chemical Formula 13]

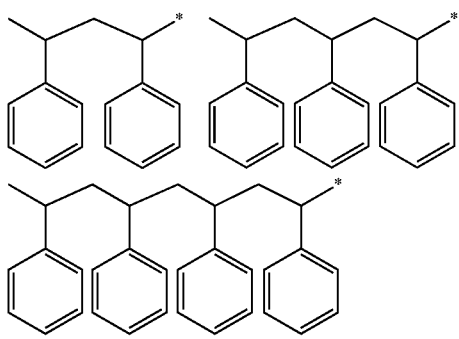

The (meth)acryloyl group specified for $R^1$ is a general term for a methacryloyl group represented by $CH_2$=C($CH_3$)—CO—* and an acryloyl group represented by $CH_2$=CH—CO—*.

Aromatic group-containing hydrocarbon groups with 6 to 100 carbon atoms for $R^1$ preferably contain one to five rings (more preferably one to three rings). When two or more rings are contained, they may be ring-condensed. In the case where two or more rings are contained, at least one ring is an aromatic ring. Also in the case where two or more aromatic rings are contained, they may be ring-condensed or directly bonded via a sigma bond.

Specific examples of such aromatic group-containing hydrocarbon groups include a phenyl group, a naphthyl group, a pentalenyl group, an indenyl group, an anthracenyl group, a phenanthryl group, a fluorenyl group, and a biphenylel group. Such an aromatic group-containing hydrocarbon group is preferably a phenyl group or a naphthyl group, and more preferably a phenyl group. In addition, a hydrogen atom of the aromatic group-containing hydrocarbon groups (such as an aryl group) may be substituted with a substituent, such as an alkyl group with 1 to 50 carbon atoms, an alkenyl group with 1 to 50 carbon atoms, or an aralkyl group with 7 to 50 carbon atoms as described above.

The alkyl group with 1 to 50 carbon atoms that can be used as a substituent on the aromatic group-containing hydrocarbon groups is, for example, preferably a linear or branched alkyl group, more preferably an alkyl group with 1 to 25 carbon atoms, further preferably an alkyl group with 5 to 15 carbon atoms, and particularly preferably a nonyl group, a decyl group, an isodecyl group, an undecyl group, or a dodecyl group.

The alkenyl group with 1 to 50 carbon atoms that can be used as a substituent on the aromatic group-containing hydrocarbon groups is, for example, preferably a linear or branched alkenyl group, more preferably a linear or branched alkenyl group with 2 to 4 carbon atoms, further preferably a vinyl group, a propenyl group (an allyl group, a 1-methylvinyl group, etc.), or a butenyl group (a 1-butenyl group, a 2-butenyl group, a 3-butenyl group, a 1-methylallyl group, a 2-methylallyl group, etc.).

The aralkyl group with 7 to 50 carbon atoms that can be used as a substituent on the aromatic group-containing hydrocarbon groups is, for example, a benzyl group, a phenethyl group (for example, a 1-phenethyl group, a 2-phenethyl group), a phenylpropyl group, a phenylbutyl group, or a phenylpentyl group. Among these, a benzyl group and a phenethyl group are more preferable, a phenethyl group is further preferable, and a 2-phenethyl group is particularly preferable.

Aromatic hydrocarbon groups bonded with an alkyl group with 1 to 50 carbon atoms, an alkenyl group with 1 to 50 carbon atoms, or an aralkyl group with 7 to 50 carbon atoms can be illustrated as follows:

[Chemical Formula 14]

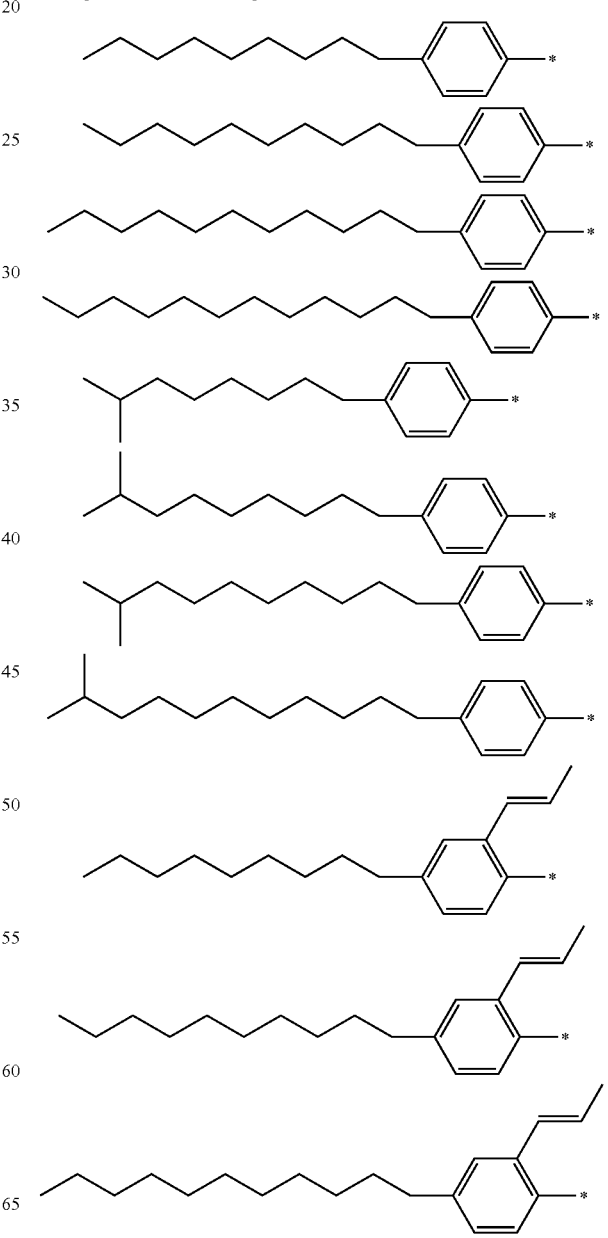

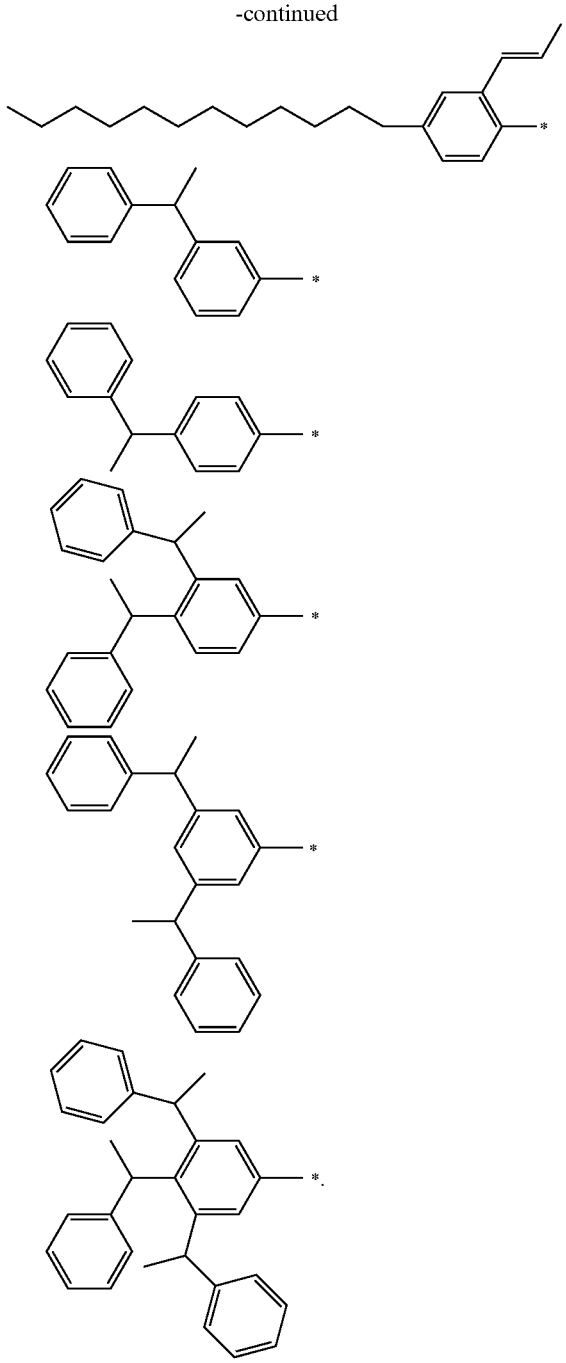

In the above-described formulae, p, q, and r each denote an integer molar ratio per mole of the above-described unit (a1), with p+q+r being equal to from 1 to 200, p being equal to from 1 to 200, q being equal to from 1 to 200, and r being equal to from 1 to 200. Preferably, p, q, and r each are from 1 to 100, more preferably each from 1 to 50, further preferably each from 1 to 30. Preferably, p+q+r is from 1 to 100, more preferably from 1 to 50, further preferably from 1 to 30.

The moieties $R^2$, $R^3$, and $R^4$ are a divalent hydrocarbon group with 1 to 18 carbon atoms, or a divalent aromatic group-containing hydrocarbon group with 6 to 30 carbon atoms, and examples include alkylene groups containing linear, and branched or cyclic structure, such as a methylene group, an ethylene group, an n-propylene group, an iso-propylene group, an n-butylene group, a tert-butylene group, a sec-butylene group, a pentylene group, an isopentylene group, a neopentylene group, a cyclopentylene group, a hexylene group, a cyclohexylene group, a 2-methylpentylene group, a 3-methylpentylene group, a 2,2-dimethylbutylene group, a 2,3-dimethylbutylene group, a heptylene group, a 2-methylhexylene group, a 3-methylhexylene group, a 2,2-dimethylpentylene group, a 2,3-dimethylpentylene group, a 2,4-dimethylpentylene group, a 3-ethylpentylene group, a 2,2,3-trimethylbutylene group, an octylene group, a methylheptylene group, a dimethylhexylene group, a 3-ethylhexylene group, a trimethylpentylene group, a 3-ethyl-2-methylpentylene group, a 2-ethyl-3-methylpentylene group, a 2,2,3,3-tetramethylbutylene group, a nonylene group, a methyloctylene group, a dimethylheptylene group, a 3-ethylheptylene group, a 4-ethylheptylene group, a trimethylhexylene group, a 3,3-diethylpentylene group, a decylene group, an isodecylene group, an undecylene group, a dodecylene group, a tridecylene group, a tetradecylene group, a pentadecylene group, a hexadecylene group, a heptadecylene group, an octadecylene group, and an isooctadecylene group. The number of carbon atoms in the alkylene groups is more preferably from 1 to 8. Further preference is given to a methylene group, an ethylene group, an n-propylene group, an iso-propylene group, an n-butylene group, a tert-butylene group, and a sec-butylene group. Particular preference is given to an ethylene group and an iso-propylene group.

The moieties $R^2$, $R^3$, and $R^4$ preferably contain one to five rings (more preferably one to three rings). When two or more rings are contained, they may be ring-condensed. Specific examples include a phenyl group, a naphthyl group, a pentalenyl group, an indenyl group, an anthracenyl group, a phenanthryl group, a fluorenyl group, and a biphenylel group. In addition, a hydrogen atom of the aromatic group-containing hydrocarbon groups may be substituted with an alkyl group with 1 to 18 carbon atoms as described above. The number of carbon atoms in the aromatic group-containing hydrocarbon groups is preferably from 6 to 18, and further preferably from 6 to 8. Particular preference is given to a styrene group.

A hydrogen atom of the moieties $R^2$, $R^3$, and $R^4$ may be substituted with an ether group. Examples of the ether group include a variety of substituents in which an ether bond (—O—) is present at the site of attachment to a (meth) acryloyl group, to a saturated or unsaturated hydrocarbon group with 1 to 50 carbon atoms, or to an aromatic group-containing hydrocarbon group with 6 to 100 carbon atoms, as described above in detail for $R^1$.

Among these, the ether group preferably is *—O—$C_nH_{2n-1}$, wherein n is an integer of from 1 to 18.

In the present invention, it is preferable that with regard to —$[R^2$—O$]_p$— among the units represented by (a2), the substituent A contains at least one linker group of the linker groups represented by formulae (a3):

[Chemical Formula 15]

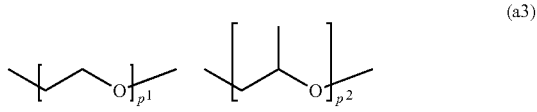

(a3)

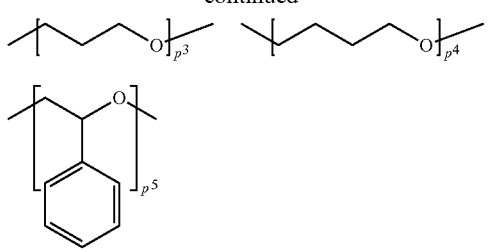

wherein $p^1$, $p^2$, $p^3$, $p^4$, and $p^5$ have the same meaning as p;

with respect to —[CO—$R^3$—COO]$_q$—, the substituent A contains at least one linker group of the linker groups represented by formulae (a4):

[Chemical Formula 16]

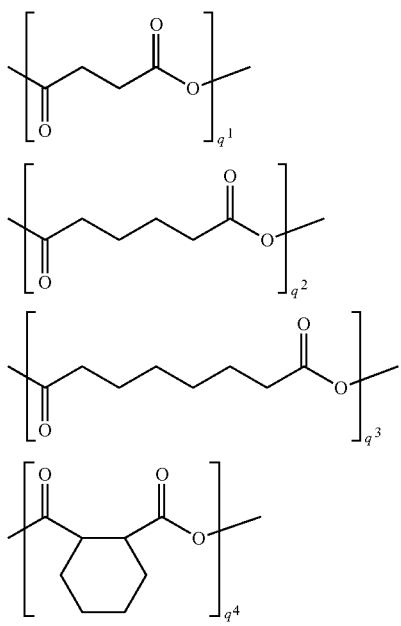

(a4)

wherein $q^1$, $q^2$, $q^3$, and $q^4$ have the same meaning as q;

with respect to —[$R^4$—COO]$_r$—, the substituent A contains at least one linker group of the linker groups represented by formulae (a5);

[Chemical Formula 17]

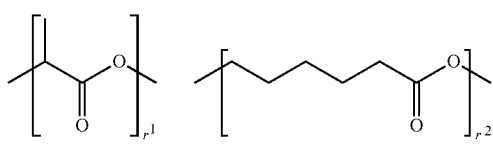

(a5)

wherein $r^1$ and $r^2$ have the same meaning as r.

It is particularly preferable, in relation to dispersibility and availability, that the substituent A contains either or both of the linker groups represented by formulae (a6):

[Chemical Formula 18]

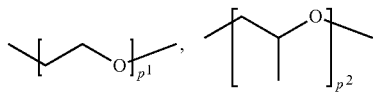

(a6)

wherein $p^1$ and $p^2$ are the same as the above. Preferably, $p^1$ and $p^2$ each are from 1 to 200, more preferably each from 1 to 100, further preferably each from 1 to 50, most preferably each from 1 to 30. Preferably, $p^1+p^2$ is from 1 to 200, more preferably from 1 to 100, further preferably from 1 to 50, most preferably from 1 to 30.

As an above-mentioned organophosphorus compound, commercially available phosphate esters can be used as appropriate, including, for example, Newcol 1000-FCP (manufactured by Nippon Nyukazai Co., Ltd.), Antox EHD-400 (manufactured by Nippon Nyukazai Co., Ltd.), a series of Phoslex phosphate esters (manufactured by SC Organic Chemical Co., Ltd.), LIGHT ACRYLATE P-1A (manufactured by Kyoeisha Chemical Co., Ltd.), LIGHT ACRYLATE P-1M (manufactured by Kyoeisha Chemical Co., Ltd.), TEGO (registered trademark) Dispers 651, 655, and 656 (manufactured by Evonik), DISPERBYK-110, -111, -180 (manufactured by BYK Japan KK), and KAYAMER PM-2 and KAYAMER PM-21 (both manufactured by Nippon Kayaku Co., Ltd.).

Illustrated as especially preferable organophosphorus compounds can be, for example, compounds represented by the following formulae, and phosphate diesters having the same substituent A as in said compounds:

[Chemical Formula 19]

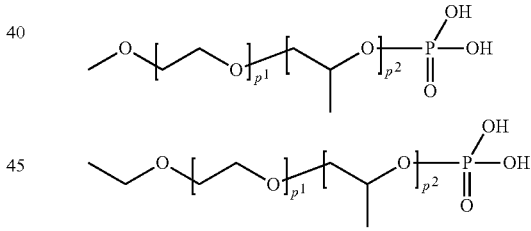

wherein $p^1$ and $p^2$ each are preferably from 1 to 100, more preferably from 1 to 50, further preferably from 1 to 30, more preferably from 4 to 15, with $p^1+p^2$ being equal to preferably from 1 to 100, more preferably from 1 to 50, further preferably from 1 to 30; compounds such as phosphate monoesters or phosphate diesters having the following formula:

[Chemical Formula 20]

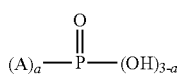

wherein a is 1 or 2, and A has at least one or more substituents selected from the group of the substituents represented by the following formulae:

[Chemical Formula 21]

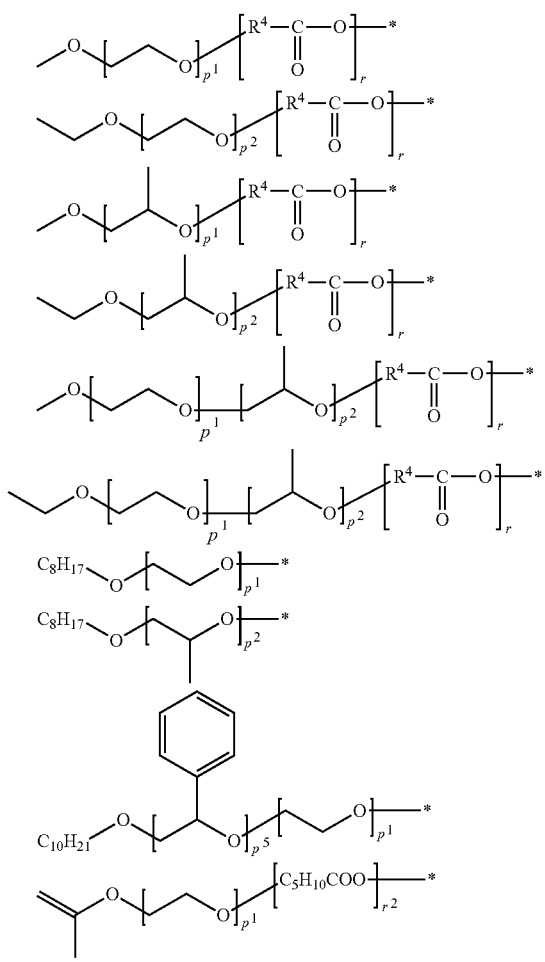

wherein $p^1$, $p^2$, and $p^5$ each are preferably from 1 to 100, more preferably from 1 to 50, further preferably from 1 to 30, more preferably from 4 to 15, with $p^1+p^2+p^5$ being equal to preferably from 1 to 100, more preferably from 1 to 50, further preferably from 1 to 30, r and $r^2$ are preferably from 1 to 100, more preferably from 1 to 50, further preferably from 1 to 20, $R^4$ is the same as the above, and * indicates the site of attachment to the phosphorus atom; compounds represented by the following formula:

[Chemical Formula 22]

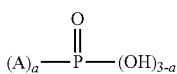

wherein a is 1 or 2, and A is at least one substituent selected from the group of the substituents represented by the following formulae:

[Chemical Formula 23]

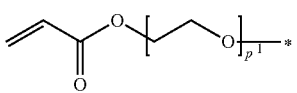

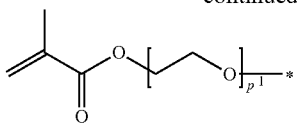

wherein $p^1$ is preferably from 1 to 100, more preferably from 1 to 50, further preferably from 1 to 30, for example, compounds represented by the following formulae:

[Chemical Formula 24]

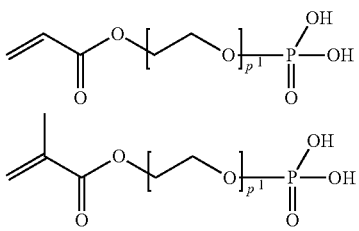

wherein $p^1$ is preferably from 1 to 100, more preferably from 1 to 50, further preferably from 1 to 30; and phosphoric acid compounds and phosphate esters represented by the following formulae:

[Chemical Formula 25]

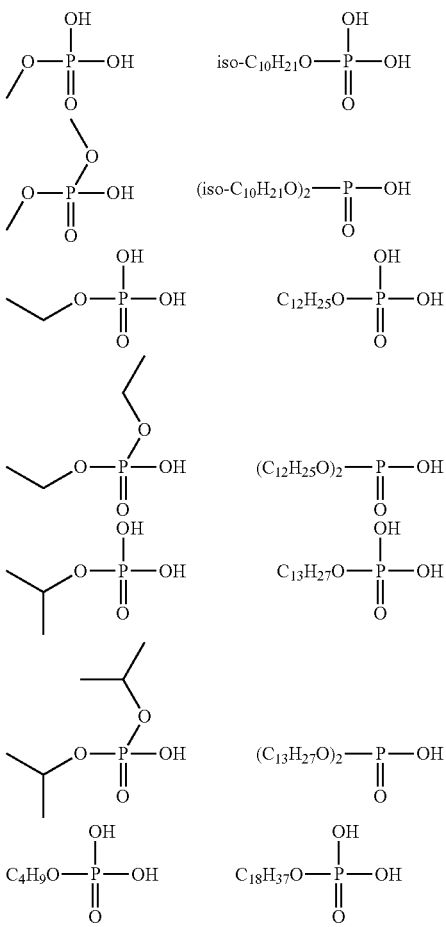

-continued

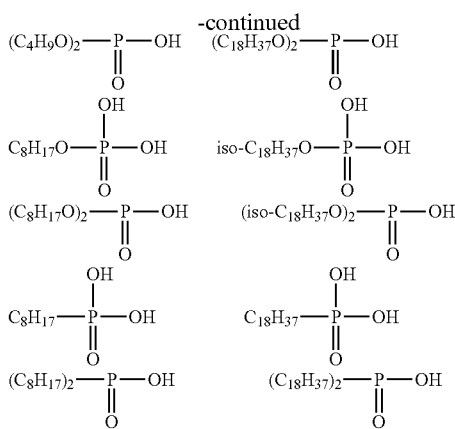

In the present invention, two or more organophosphorus compounds or salts thereof having different structures, such as phosphate monoesters and phosphate diesters, may be used each alone or in combination.

2) Organosulfur Compounds Employed in the Present Invention

As the organosulfur compounds that is employed in the present invention, preferred is a compound represented by formula (2):

[Chemical Formula 26]

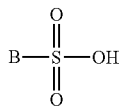
(2)

wherein B denotes a substituent represented by the below-mentioned formula (b1), or a substituent comprising the substituent represented by the below-mentioned formula (b1) and at least one of the linker groups represented by the below-mentioned formulae (b2), wherein when B comprises the linker groups represented by the below-mentioned formulae (b2), the below-mentioned formulae (b2) is bonded to the sulfur atom via the oxygen atom:

[Chemical Formula 27]

$R^5—(O)_t—$ (b1)

wherein $R^5$ denotes a saturated or unsaturated hydrocarbon group with 1 to 50 carbon atoms, a (meth)acryloyl group, or an aromatic group-containing hydrocarbon group with 6 to 100 carbon atoms, and t is 0 or 1;

[Chemical Formula 28]

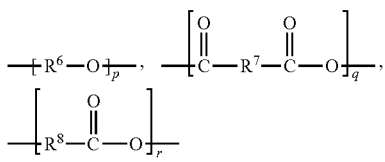
(b2)

wherein $R^6$, $R^7$, and $R^8$ are a divalent hydrocarbon group with 1 to 18 carbon atoms, or a divalent aromatic group-containing hydrocarbon group with 6 to 30 carbon atoms, and a hydrogen atom of each of the $R^6$, $R^7$, and $R^8$ may be substituted with an ether group; p, q, and r each denote an integer molar ratio per mole of the unit (b1), with p+q+r being equal to from 1 to 200, p being equal to from 1 to 200, q being equal to from 1 to 200, and r being equal to from 1 to 200.

In the formula (b1), $R^5$ can be selected from groups similar to saturated or unsaturated hydrocarbon groups with 1 to 50 carbon atoms, (meth)acryloyl groups, and aromatic group-containing hydrocarbon groups with 6 to 100 carbon atoms as described above in detail for $R^1$. As in the case of $R^1$, a hydrogen atom of the saturated or unsaturated hydrocarbon groups with 1 to 50 carbon atoms may be substituted with an aromatic group-containing hydrocarbon group with 6 to 100 carbon atoms, and a hydrogen atom of the aromatic group-containing hydrocarbon groups (such as an aryl group) may be substituted with a substituent, such as an alkyl group with 1 to 50 carbon atoms, an alkenyl group with 1 to 50 carbon atoms, or an aralkyl group with 7 to 50 carbon atoms.

Among these, $R^5$ preferably is a linear or branched alkyl group with 1 to 50 carbon atoms, a linear or branched alkenyl group with 2 to 50 carbon atoms, a (meth)acryloyl group, or an aromatic group-containing hydrocarbon group with 6 to 20 carbon atoms, more preferably a linear or branched alkyl group with 1 to 30 carbon atoms, a linear or branched alkenyl group with 2 to 30 carbon atoms, or an aromatic group-containing hydrocarbon group with 6 to 20 carbon atoms, further preferably a linear or branched alkyl group with 1 to 25 carbon atoms, a linear or branched alkenyl group with 2 to 25 carbon atoms, or an aromatic group-containing hydrocarbon group with 6 to 10 carbon atoms. Particularly preferable $R^5$ is a vinyl group, a propenyl group (an allyl group, a 1-methylvinyl group, etc.), a butenyl group (a 1-methylallyl group, a 2-methylallyl group, etc.), or an optionally substituted phenyl group. More preferable $R^5$ is a vinyl group, a propenyl group, a butenyl group, or any of the substituents illustrated by the following formulae:

[Chemical Formula 29]

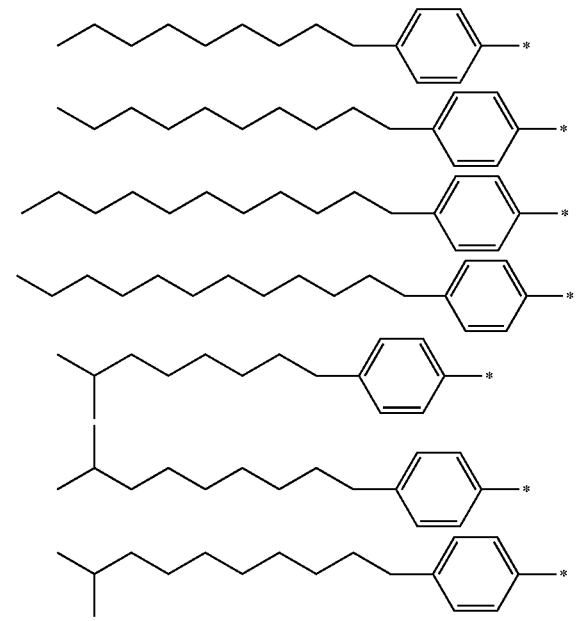

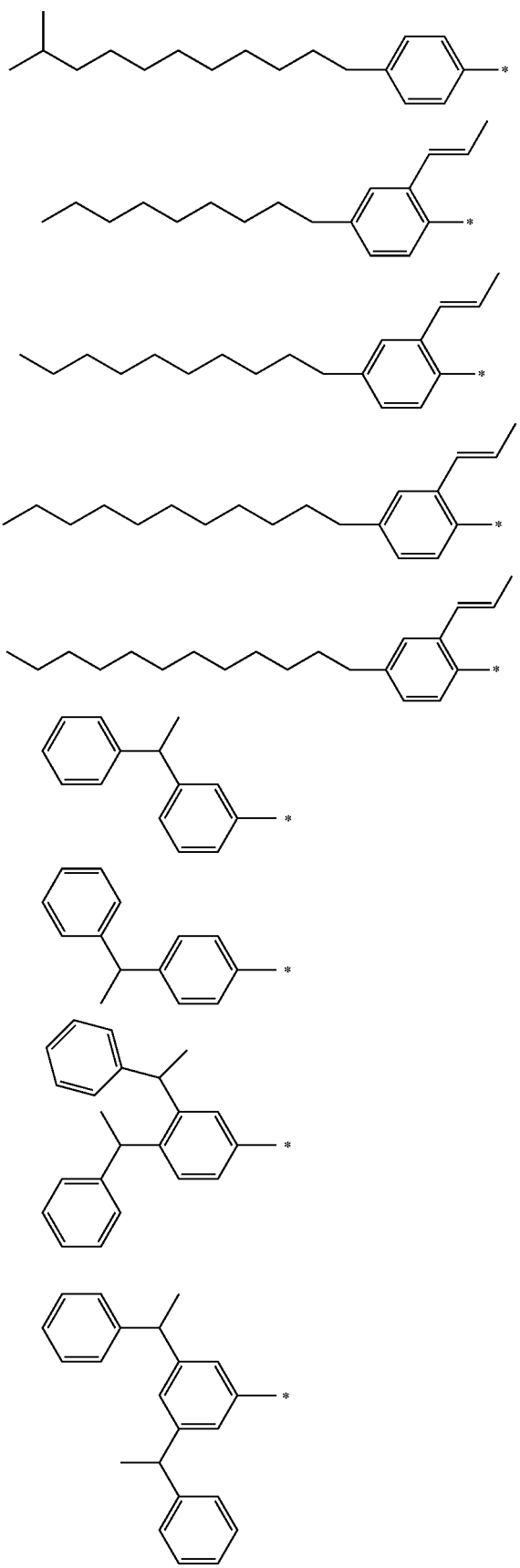

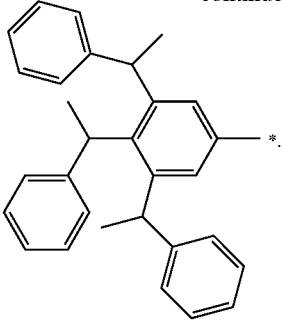

In the above-described formulae, p, q, and r each denote an integer molar ratio per mole of the (b1) unit, and p+q+r preferably is from 1 to 100, with p being equal to from 1 to 50, q being equal to from 1 to 50, and r being equal to from 1 to 50. In addition, t preferably is 0. In addition, $R^6$, $R^7$, and $R^8$ preferably have the same structure as in $R^2$, $R^3$, and $R^4$, respectively.

It is particularly preferable, in relation to dispersibility and availability, that the substituent B contains either or both of the linker groups represented by formulae (a6):

[Chemical Formula 30]

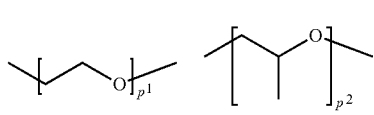

(a6)

wherein $p^1$ and $p^2$ are the same as the above. Preferably, $p^1$ and $p^2$ each are from 1 to 200, more preferably each from 1 to 100, further preferably each from 1 to 50, most preferably each from 1 to 30. Preferably, $p^1+p^2$ is from 1 to 200, more preferably from 1 to 100, further preferably from 1 to 50, most preferably from 1 to 30.

Organosulfur compounds as defined above include, for example, benzenesulfonic acid, dodecylbenzenesulfonic acid, methylsulfonic acid, ethylsulfonic acid, and organosulfur compounds represented by the following formulae:

[Chemical Formula 31]

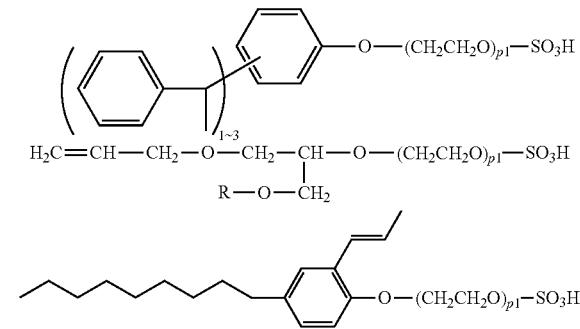

wherein $p^1$ is the same as the above, and R is any substituent.

The organophosphorus compound and/or organosulfur compound may be a salt(s) thereof, including, for example, alkali metal salts such as sodium salts and potassium salts, alkaline earth metal salts such as calcium salts, and quaternary ammonium salts.

It is preferable that from the viewpoint of refractive index, an organophosphorus compound and/or organosulfur compound having a particular chemical structure are/is not contained in large amounts. For example, an organophosphorus compound and/or organosulfur compound having a particular chemical structure are/is preferably contained in a total amount of 0.01 to 10 mass %, more preferably 0.1 to 5 mass %, further preferably 0.7 to 3 mass % in 100 mass % of the dispersion. Amounts below this range may fail to achieve a sufficient effect of increasing the storage stability and the compatibility with monomers.

It is also preferable that an organophosphorus compound and/or organosulfur compound having a particular chemical structure are/is contained in amounts of mot more than 30 mass % relative to 100 mass % of the metal oxide particles. In optical applications, an organophosphorus compound and/or organosulfur compound having a particular chemical structure are/is preferably added, for example, in an amount of 0.05 to 20 mass %, more preferably 0.5 to 10 mass %, further preferably 1 to 5 mass %. If an organophosphorus compound and/or organosulfur compound having a particular chemical structure is within this range, it is possible that the dispersion exhibits a superior storage stability without causing agglomeration of the metal oxide particles.

The time when an organophosphorus compound and/or organosulfur compound having a particular chemical structure are/is added to a dispersion is not limited. For example, an organophosphorus compound and/or organosulfur compound having a particular chemical structure may be added by (i) mixing all of dry metal oxide particles, a dispersion medium, and the organophosphorus compound and/or organosulfur compound, or by (ii) contacting the organophosphorus compound and/or organosulfur compound with a liquid in which metal oxide particles are pre-dispersed in a dispersion medium.

The temperature at the time when an organophosphorus compound and/or organosulfur compound having a particular chemical structure are/is added to a dispersion is not limited, and preferably is about from 0 to 80° C., and more preferably is about from 20 to 60° C. In addition, the pressure at the time when an organophosphorus compound and/or organosulfur compound having a particular chemical structure are/is added to a dispersion is not limited, and preferably is ordinary pressure, which is about from 0.9 to 1.1 atm.

<Metal Oxide Particles>

Metal oxide particles for use in the present invention may ones which are commercially available or have not undergone any surface treatment, and can also be surface-treated depending on intended applications. Examples of the metal that forms metal oxide particles for use in the present invention include Ti, Al, Zr, In, Zn, Sn, La, Y, Ce, Mg, Ba, and Ca, and the metal preferably is at least one selected from the group consisting of Ti, Al, Zr, Zn, Sn, and Ce, particularly Zr, from a viewpoint that a metal oxide with a high refractive index can be provided. The metal oxide may be an oxide of a single metal, a solid solution of two or more oxides, or a composite oxide. Examples of mono-metal oxides include aluminum oxide ($Al_2O_3$), titanium oxide ($TiO_2$), zirconium oxide ($ZrO_2$), indium oxide ($In_2O_3$), zinc oxide (ZnO), tin oxide ($SnO_2$), lanthanum oxide ($La_2O_3$), yttrium oxide ($Y_2O_3$), cerium oxide ($CeO_2$), and magnesium oxide (MgO). Examples of solid solutions of two or more oxides include ITO and ATO. Examples of composite oxides include barium titanate ($BaTiO_3$), perovskite ($CaTiO_3$), and spinel ($MgAl_2O_4$).

The crystallite size of metal oxide particles determined by X-ray diffraction analysis is preferably not more than 20 nm. By adjusting the crystallite size of metal oxide particles to be not more than 20 nm, it is possible to increase the rate of transparency of a composition containing the metal oxide particles. The crystallite size is more preferably not more than 15 nm, further preferably not more than 10 nm. The lower limit of the crystallite size usually is about 1 nm.

The crystal structure of metal oxide particles is, for example, cubic, tetragonal, monoclinic, or the like. Especially, it is preferable that not less than 50% of the entire crystal structure has a tetragonal structure. This is preferable because the refractive index can be increased with a higher percentage of a tetragonal structure. The ratio of tetragonal structure to monoclinic structure (the tetragonal/monoclinic ratio) is, for example, not less than 0.8, preferably not less than 1.0, more preferably not less than 1.1. It is also possible that only a tetragonal structure is contained.

The shape of metal oxide particles is spherical, granular, oval spherical, cubic, rectangular, pyramidal, needle-like, columnar, rod-like, tubular, scale-like, plate-like, flake-like, or the like. In view of the dispersibility in solvents, for example, it is preferable that the shape is spherical, granular, columnar, or the like.

In the cases of employing surface-treated metal oxide particles (which may be referred to hereinafter as coated metal oxide particles), commercially available metal oxide particles can be subjected to surface treatment with various surface-treatment agents by means of known methods. In addition, it is also possible to synthesize coated metal oxide particles from a coated-metal-oxide-particles precursor by means of a hydrothermal synthesis as described below.

When commercially available coated metal oxide particles are used to be subjected to surface treatment with various surface-treatment agents, an organic acid, a silane coupling agent, a surfactant, or a titanium coupling agent is preferably employed. When the surface treatment agent is an organic acid, an organic acid described below is preferably employed. Such an organic acid can function both as a component of the composition and as a surface-treatment agent, and represents a preferable embodiment of the present invention. Regarding the case when a silane coupling agent is employed, a detailed explanation will be given below.

As a surfactant, preferred are ionic surfactants, such as anionic surfactants, cationic surfactants and zwitterionic surfactants, or nonionic surfactants. Anionic surfactants include, for example, fatty acid-based surfactants, e.g., fatty acid sodium salts such as sodium oleate, sodium stearate, and sodium laurate, fatty acid potassium salts, and sodium fatty acid ester sulfonate, phosphate-based surfactants such as sodium alkylphosphate, olefinic surfactants such as sodium alpha olefin sulfonate, alcohol-based surfactants such as sodium alkylsulfate, and alkylbenzene-based surfactants. Cationic surfactants include, for example, alkylmethylammonium chloride, alkyldimethylammonium chloride, alkyltrimethylammonium chloride, and alkyldimethylbenzylammonium chloride. Zwitterionic surfactants include, for example, carboxylate-based surfactants such as alkylaminocarboxylate salts, and phosphate-based surfactants such as phosphobetaine. Nonionic surfactants include, for example, fatty acid-based surfactants such as polyoxyethylene lauric fatty acid ester and polyoxyethylene sorbitan fatty acid ester, polyoxyethylene alkylphenyl ether, and fatty acid alkanol amide.

Titanium coupling agents include, for example, isopropyltriisostearoyltitanate, isopropyldimethacrylisostearoyltitanate, isopropyltri(dodecyl)benzenesulfonyltitanate, neopentyl(diallyl)oxy-tri(dioctyl)phosphate titanate, and neopentyl(diallyl)oxy-trineodododecanoyltitanate.

<Organic Acids>

In the present invention, an organic acid is contained to enhance the dispersibility of the metal oxide particles as mentioned above. The organic acid is preferably contained in the composition in a manner in which the surfaces of the metal oxide particles are coated with the organic acid. A preferred organic acid is a carboxylic acid compound having a carboxyl group. A carboxylic acid compound is chemically bonded to metal oxide particles, or forms a carboxylic acid or a salt thereof together with a hydrogen atom or cationic atom to attach onto metal oxide particles; thus the term "coated" as used in the present invention includes both a state in which a carboxylic acid compound is chemically bonded to metal oxide particles and a state in which a carboxylic acid compound is physically attached onto metal oxide particles.

Preferred carboxylic acid compounds are hydrocarbons having one or more carboxylic acid groups (preferably one carboxylic acid group), such as, (meth)acrylic acids; carboxylic acids having one or more substituents selected from the group consisting of an ester group, an ether group, an amido group, a thioester group, a thioether group, a carbonate group, a urethane group, and a urea group (which may be referred to hereinafter as a specified substituent(s)); linear carboxylic acids (linear aliphatic carboxylic acids, preference being given to linear saturated aliphatic carboxylic acids, etc.), branched carboxylic acids (branched aliphatic carboxylic acids, preference being given to branched saturated aliphatic carboxylic acids, etc.), cyclic carboxylic acids (alicyclic carboxylic acids, preference being given to alicyclic carboxylic acids with no unsaturated double bond, etc.) with 4 to 20 carbon atoms; or aromatic carboxylic acids.

Specific examples of such carboxylic acid compounds include (meth)acrylic acids, such as acrylic acid, methacrylic acid, and a (meth)acryloyloxy-$C_{1-6}$-alkylcarboxylic acid such as 3-acryloyloxypropionic acid; carboxylic acids with an ester group, such as a half ester of a $C_{3-9}$ aliphatic dicarboxylic acid with a (meth)acryloyloxy-$C_{1-6}$-alkyl alcohol, such as 2-acryloyloxyethyl succinic acid and 2-methacryloyloxyethyl succinic acid, a half ester of a $C_{5-10}$ alicyclic dicarboxylic acid with a (meth)acryloyloxy-$C_{1-6}$-alkyl alcohol, such as 2-acryloyloxyethyl hexahydrophthalic acid and 2-methacryloyloxyethyl hexahydrophthalic acid, a half ester of a $C_8$-14 aromatic dicarboxylic acid with a (meth)acryloyloxy-$C_{1-6}$-alkyl alcohol, such as 2-acryloyloxyethyl phthalic acid and 2-methacryloyloxyethyl phthalic acid; linear carboxylic acids, such as butyric acid, valeric acid, hexanoic acid, heptanoic acid, octanoic acid, nonanoic acid, decanoic acid, dodecanoic acid, tetradecanoic acid, and stearic acid; branched carboxylic acids, such as pivalic acid, 2,2-dimethylbutyric acid, 3,3-dimethylbutyric acid, 2,2-dimethylvaleric acid, 2,2-diethylbutyric acid, 3,3-diethylbutyric acid, 2-methylhexanoic acid, 2-ethylhexanoic acid, 3-methylhexanoic acid, 3-ethylhexanoic acid, 2-methylheptanoic acid, 4-methyloctanoic acid, and neodecanoic acid; and cyclic carboxylic acids, such as naphthenic acid and cyclohexanedicarboxylic acids.

Among these, preferred carboxylic acid compounds are at least (meth)acrylic acids, or carboxylic acids having one or more substituents selected from the group consisting of an ester group, an ether group, an amido group, a thioester group, a thioether group, a carbonate group, a urethane group, and a urea group (which may be referred to hereinafter as a specified substituent(s)). Hereinafter, (meth)acrylic acids, and carboxylic acids having a specified substituent(s) may be collectively referred to as a "first carboxylic acid compound."

According to a more preferable aspect of the present invention, two or more carboxylic acid compounds are used as the organic acid. In particular, it is preferable that a hydrocarbon having one or more carboxylic acid groups (preferably one carboxyl group), such as a linear carboxylic acid, a branched carboxylic acid, a cyclic carboxylic acid, or an aromatic carboxylic acid (which may be collectively referred to as a "second carboxylic acid compound") is used in combination with the above-mentioned first carboxylic acid compound. Specifically, according to a best embodiment, both a first carboxylic acid compound and a second carboxylic acid compound are contained and the surfaces of metal oxide particles are preferably coated with them.

Although methods for the production of metal oxide particles and metal oxide particles coated with an organic acid will be described below, examples include a method of adding a carboxylic acid compound or compounds to a dispersion liquid of metal oxide particles. Preferably employed is a method in which before metal oxide particles are coated with a first carboxylic acid compound, the particles are coated with a second carboxylic acid compound, and then subjected to reaction with the carboxylic acid compound. In the latter method, some of the second carboxylic acid compound is displaced with the first carboxylic acid compound, whereby metal oxide particles coated with the first and second carboxylic acid compounds are obtained. The coated metal oxide particles obtained by this method have an extremely good dispersibility in various media and make it possible that they are applied to a variety of applications. The metal oxide particles are remarkably useful for applications in which fine microstructures, particularly typified by resists, are formed, and can be expected to bring about, for example, an effect of making it possible to improve uneven dispersion or to reduce development residues.

The first carboxylic acid compound is a (meth)acrylic acid, or has one or more specified substituents, in which case the first carboxylic acid compound may have a plurality of the same or different specified substituents, and may further have a substituent other than the specified substituent(s). The specified substituent preferably is an ester group, an ether group, or an amido group, further preferably an ester group or an ether group, from the viewpoint of availability. The first carboxylic acid compound can have any number of specified substituents if one or more specified substituents are contained per molecule, and the upper limit of the number of specified substituents per molecule is not limited. However, the first carboxylic acid compound preferably comprises not more than 20 specified substituents, more preferably not more than 10 specified substituents, and further preferably not more than 5 specified substituents, in terms of handling during the production of coated metal oxide particles.

For the first carboxylic acid compound, a commercially available one may be used. Alternatively, a first carboxylic acid compound can also be synthesized by known methods. Typical examples include a method of reacting an alcohol compound and a dibasic acid or acid anhydride to obtain an ester compound (a half ester compound, etc.), a method of reacting an epoxy compound or glycidyl compound and a dibasic acid to obtain an ester compound (a half ester compound, etc.), a method of reacting an amine compound and a dibasic acid or acid anhydride to obtain an amide compound, and a method of reacting a thiol compound and a dibasic acid or acid anhydride to obtain a thioester compound.

The α-carbon to the carboxyl group of a first carboxylic acid compound is any of a secondary carbon, a tertiary carbon, a quaternary carbon, or an aromatic carbon. The number of carboxyl groups in a first carboxylic acid compound may be not less than one, but preferably is not more than 3, more preferably 2, most preferably 1, in order to avoid the occurrence of crosslinking between particles during the production of coated metal oxide particles.

From a viewpoint of the easiness of exchange between a first carboxylic acid compound and a second carboxylic acid compound as described above, the difference between the pKa of the first carboxylic acid compound ($pKa_1$) and the second carboxylic acid compound ($pKa_2$; $pKa_1$-$pKa_2$) is preferably not higher than −0.1, more preferably not higher than −0.2, further preferably not higher than −0.3. The pKa of the first carboxylic acid compound specifically is preferably not higher than 4.8, more preferably not higher than 4.7, further preferably not higher than 4.6. The lower limit of the pKa of the first carboxylic acid compound is not limited, and may be, for example, about 2.0, particularly about 3.0. The pKa of the second carboxylic acid compound is, for example, about 4.0 to 6.0, preferably about 4.2 to 5.5, further preferably about 4.5 to 5.0. For the pKa of a carboxylic acid compound, a value calculated with computational chemistry software ACD/pKa version 10.01 (manufactured by Advanced Chemistry Development. Inc.) can be used.

In addition, a carboxylic acid compound preferably has a polymerizable double bond, particularly a polymerizable carbon-carbon double bond. When metal oxide particles have been coated with such an organic acid, the particles have a polymerizable double bond on their surface, allowing copolymerization with another mixed component, so that it is possible that a good state of dispersion is also maintained in a cured material without causing problems of agglomeration and bleedout during curing. The polymerizable double bond may be contained on a first carboxylic acid compound or on a second carboxylic acid compound. Both a first carboxylic acid compound and a second carboxylic acid compound may have a polymerizable double bond. Preference is given to an embodiment in which a first carboxylic acid compound has a polymerizable double bond and a second carboxylic acid compound does not. When two or more first or second carboxylic acid compounds are used, it is sufficient that at least one of these compounds has a polymerizable double bond.

Especially, as the first carboxylic acid compound, preferred are acrylic acid, 2-acryloyloxyethyl succinic acid, 2-acryloyloxyethyl hexahydrophthalic acid, and 2-acryloyloxyethyl phthalic acid, and particularly preferred is 2-acryloyloxyethyl succinic acid. The second carboxylic acid compound suitably is a branched carboxylic acid. Particularly preferred are 2-methylhexanoic acid, 2-ethylhexanoic acid, 3-methylhexanoic acid, and 3-ethylhexanoic acid. By using a branched carboxylic acid, it is possible to efficiently achieve inhibition of the agglomeration of metal oxide particles.

For the first carboxylic acid compound, a single first carboxylic acid compound may be used. Alternatively, two or more first carboxylic acid compounds may be used in combination. Regarding the ratio of a first carboxylic acid compound, the first carboxylic acid compound preferably is in amounts of not less than 0.1 parts by mass per 100 parts by mass of metal oxide particles. By setting the amount of a first carboxylic acid compound as just mentioned, it is possible to increase the dispersibility of metal oxide particles in solvents or others during production or within products. More preferably, the amount of the first carboxylic acid compound is not less than 0.5 parts by mass, further preferably 2 parts by mass. Too large amount of addition reduces the content of metal oxide particles per unit volume, and thus is not preferable. Therefore, the amount of the first carboxylic acid compound usually is not more than 30 parts by mass, preferably not more than 25 parts by mass, more preferably not more than 20 parts by mass. Further, the amount of the first carboxylic acid compound preferably may be not less than 5 parts by mass, more preferably not less than 10 parts by mass, particularly preferably not less than 15 parts by mass.

For the second carboxylic acid compound, a single second carboxylic acid compound may be used. Alternatively, two or more second carboxylic acid compounds may be used in combination. Regarding the ratio between metal oxide particles and a second carboxylic acid compound, the second carboxylic acid compound preferably is in amounts of not less than 0.1 parts by mass per 100 parts by mass of metal oxide particles. By setting the amount of a second carboxylic acid compound as just mentioned, it is possible to increase the dispersibility of metal oxide particles in solvents or others during production or within products. More preferably, the amount of the second carboxylic acid compound is not less than 0.5 parts by mass, further preferably not less than 2 parts by mass. Too large amount of addition reduces the content of metal oxide particles per unit volume, and thus is not preferable. Therefore, the amount of the second carboxylic acid compound usually is not more than 30 parts by mass, preferably not more than 25 parts by mass, more preferably not more than 20 parts by mass. Further, the amount of the second carboxylic acid compound preferably may be not more than 10 parts by mass, more preferably not more than 5 parts by mass.

When both a first carboxylic acid compound and a second carboxylic acid compound are added to metal oxide particles, the mass ratio is preferably from 1/99 to 99/1, more preferably from 50/50 to 99/1, further preferably from 60/40 to 97/3, particularly preferably from 65/35 to 90/10, as expressed as a ratio of first/second carboxylic acid compound. By adjusting their amounts of addition within the mentioned range, the affinity to various media, such as hydrophilic and hydrophobic media is increased, resulting in an increase in the dispersibility in these media.

The amount of a carboxylic acid compound to be added is preferably not less than 0.2 parts by mass, more preferably not less than 1 part by mass, further preferably not less than 2 parts by mass, and preferably not more than 40 parts by mass, more preferably not more than 35 parts by mass, further preferably not more than 30 parts by mass per 100 parts by mass of a composition of metal oxide particles after the addition of the carboxylic acid compound. Further, the amount of the carboxylic acid compound preferably may be not less than 5 parts by mass, more preferably not less than 7 parts by mass, particularly preferably not less than 10 parts by mass. When both a first carboxylic acid compound and a second carboxylic acid compound are added to metal oxide particles, the amount of the carboxylic acid compound to be added is to be read as the total amount of the first carboxylic acid compound and the second carboxylic acid compound.

<Coated Metal Oxide Particles>

There are now described cases of employing coated metal oxide particles, which are a particularly preferable embodiment of the present invention. Coated metal oxide particles used in the present invention have their surface coated with an organic acid and others, and thus are predisposed to be dispersed in media.

The following describes a typical method for producing coated metal oxide particles of the present invention, the steps of which may be modified as appropriate. In the description below, a method for producing coated metal oxide particles is described in detail in which the metal oxide particles are coated with both a first carboxylic acid compound and a second carboxylic acid compound. In the cases where coated metal oxide particles have only a second carboxylic acid compound with which the metal oxide particles are coated, however, it is possible to carry out only the below-mentioned step of preparing particles coated with the second carboxylic acid compound (a coated-metal-oxide-particles precursor). In the cases where coated metal oxide particles have only a first carboxylic acid compound with which the metal oxide particles are coated, the same production method as described below is carried out except that the second carboxylic acid compound is not used, or it is possible that the below-mentioned displacement of the second carboxylic acid compound with the first carboxylic acid compound is carried out until the second carboxylic acid compound has left the particles.

The coated-metal-oxide-particles precursor can be produced by preparing first a coated-metal-oxide-particles precursor in which the metal oxide particles are coated with a second carboxylic acid compound, and then displacing the second carboxylic acid compound with which the surfaces of the coated-metal-oxide-particles precursor have been coated, with a first carboxylic acid compound.

First, the preparation of a coated-metal-oxide-particles precursor will be described. A coated-metal-oxide-particles precursor is obtained by performing a hydrothermal synthesis using a metal component and a second carboxylic acid compound in the presence of water.

The metal component is not limited, as long as the metal is contained in a compound that generates a metal oxide by the hydrothermal reaction. Metal-component containing compounds include a variety of metal oxide particles precursors, for example, hydroxides, chlorides, oxychlorides, sulfates, acetates, organic acid salts, alkoxides, etc. of various metals, and further may be salts of various metals and a second carboxylic acid compound. For example, examples for zirconium include zirconium hydroxide, zirconium chloride, zirconyl oxychloride, zirconyl oxyacetate, zirconyl oxynitrate, zirconium sulfate, zirconium octanoate, zirconium 2-ethylhexanoate, zirconium oxide oleate, zirconium acetate, zirconium oxide stearate, zirconium oxide laurate, and zirconium alkoxides such as tetrabutoxyzirconium. For titanium, the method is preferable in the cases of titanium hydroxide, titanium chloride, titanium oxychloride, titanium oxyacetate, titanium oxynitrate, titanium sulfate, titanium octanoate, titanium oxide oleate, titanium acetate, titanium oxide stearate, titanium oxide laurate, titanium alkoxides such as tetrabutoxytitanium (for example, tetra-n-butoxytitanium), and others.

The metal that forms metal oxide particles precursor preferably includes at least one selected from Ti, Al, Zr, Zn, Sn, and Ce, more preferably includes Ti and Zr, and further preferably includes Zr.

The second carboxylic acid compound includes a linear carboxylic acid, a branched carboxylic acid, a cyclic carboxylic acid, or an aromatic carboxylic acid, although the second carboxylic acid compound is not limited. For example, the second carboxylic acid compound can be a linear carboxylic acid, such as hexanoic acid, heptanoic acid, octanoic acid, nonanoic acid, decanoic acid, dodecanoic acid, tetradecanoic acid, and stearic acid; a branched carboxylic acid, such as 2-ethylhexanoic acid, 2-methylheptanoic acid, 4-methyloctanoic acid, neodecanoic acid, pivalic acid, 2,2-dimethylbutyric acid, 3,3-dimethylbutyric acid, 2,2-dimethylvaleric acid, 2,2-diethylbutyric acid, and 3,3-diethylbutyric acid; or a cyclic carboxylic acid, such as naphthenic acid and cyclohexanedicarboxylic acid.

In the present invention, by subjecting a metal component and a second carboxylic acid compound to a hydrothermal reaction, a coated-metal-oxide-particles precursor can be produced in which the metal oxide particles have been coated with the second carboxylic acid compound.

It is preferable that at least one or more selected from the following: (i) a salt of a second carboxylic acid compound and a metal oxide particles precursor, (ii) a metal salt of a second carboxylic acid compound, and (iii) a second carboxylic acid compound and a metal oxide particles precursor, are subjected to the hydrothermal reaction.

In the description below, the case (i) is described in detail which is suitable in the cases where as the metal oxide particles precursor, metal oxide particles precursors that are water soluble and highly corrosive, for example, a chloride such as an oxychloride, and a nitrate such as an oxynitrate, of the metal are used as a raw material.

The salt in the case (i) may be not only a single compound which is composed of the carboxylic acid and the metal oxide particles precursor at a stoichiometric ratio, but also a composite salt or a composition in which unreacted carboxylic acid or metal oxide particles precursor is present.

In the case (i), the salt of the second carboxylic acid compound and the metal oxide particles precursor preferably is a salt obtained by reacting a carboxylate salt-containing composition derived from the second carboxylic acid compound with the metal oxide particles precursor, wherein the second carboxylic acid compound is neutralized with an alkali metal or alkaline earth metal by neutralization to a degree of neutralization in the range of from 0.1 to 0.8.

The degree of neutralization preferably is from 0.1 to 0.8, more preferably from 0.2 to 0.7. At degrees of neutralization below 0.1, the salt cannot be sufficiently formed due to a low solubility of the second carboxylic acid compound. At degrees of neutralization above 0.8, a large amount of white precipitates assumed to be a hydroxide(s) of the metal may be generated, reducing the yield of the coated metal oxide particles. The alkali metal or alkaline earth metal that is used to obtain the carboxylate salt-containing composition may be of any type, and preferably is a metal that forms a highly soluble carboxylate salt. Alkali metals, particularly sodium and potassium, are suitable.

The ratio between the carboxylate salt-containing composition and the metal oxide particles precursor is a ratio at which the amount of the carboxyl groups preferably is from 1 to 20 mol, more preferably from 1.2 to 18 mol, and further preferably from 1.5 to 15 mol relative to one mole of metal oxide particles precursor.

In order to react the carboxylate salt-containing composition and the metal oxide particles precursor, their aqueous solutions are preferably mixed together. The reaction temperature does not matter, as long as the aqueous solution can be maintained, and preferably is from room temperature to 100° C., more preferably from 40 to 80° C.

The salt formed by reacting the carboxylate salt-containing composition and the metal oxide particles precursor may be subjected directly to a hydrothermal reaction, but insoluble by-products are preferably removed by filtration or others.

The following provides a detailed description of the case (ii).

In an embodiment adopting the case (ii), a previously prepared metal salt of the second carboxylic acid compound is used. This embodiment has an advantage that the salt can be subjected to a hydrothermal reaction without going through complicated steps as described above. However, since easily available compounds are limited, metal oxide particles that have been coated with an organic group of interest cannot be obtained in some cases. The metal is not limited, and preferably includes at least one selected from Ti, Al, Zr, Zn, Sn, and Ce.

Examples of metal salts that can be used in an embodiment adopting the case (ii) include titanium 2-ethylhexanoate, titanium 3,3-dimethylbutyrate, titanium octanoate, titanium oxide oleate, titanium oxide stearate, titanium oxide laurate, aluminum octanoate, zirconium octanoate, zirconium 2-ethylhexanoate, zirconium oxide oleate, zirconium oxide stearate, zirconium oxide laurate, zinc octanoate, tin octanoate, and cerium octanoate.

While a metal salt with a low purity may be purified and used, a commercially available or previously prepared salt can be subjected directly to a hydrothermal reaction.

The following provides a detailed description of the case (iii).

Examples of the metal oxide particles precursor in the case (iii) include hydroxides, chlorides, oxychlorides, sulfates, acetates, organic acid salts, and alkoxides of various metals. For zirconium, the method is preferable in the cases of zirconium hydroxide, zirconium chloride, zirconyl oxychloride, zirconyl oxyacetate, zirconyl oxynitrate, zirconium sulfate, zirconium octanoate, zirconium oxide oleate, zirconium acetate, zirconium oxide stearate, zirconium oxide laurate, zirconium alkoxides such as tetrabutoxyzirconium, and others. For titanium, the method is preferable in the cases of titanium hydroxide, titanium chloride, titanium oxychloride, titanium oxyacetate, titanium oxynitrate, titanium sulfate, titanium octanoate, titanium oxide oleate, titanium acetate, titanium oxide stearate, titanium oxide laurate, titanium alkoxides such as tetrabutoxytitanium (for example, tetra-n-butoxytitanium), and others.

The second carboxylic acid compound is the same as described in the case (i).

The metal oxide particles precursor and the second carboxylic acid compound are preferably mixed in the presence of water. In this case, the mixing is suitably carried out with heating or under reduced pressure because by doing so, compounds with low boiling points that are contained in the metal oxide particles precursor, such as ammonia and acetic acid, are removed out of the system, resulting in preventing the pressure from increasing in a hydrothermal reaction at the subsequent step. Also, the reaction may be carried out in a solution to which a below-mentioned organic solvent has been added.

Next, hydrothermal reactions will be described.

A composition of metal oxide particles is obtained by subjecting any of the above-described (i) to (iii) to a hydrothermal reaction. When the use of any of the above-described (i) to (iii) alone causes a high viscosity of the hydrothermal reaction solution and the hydrothermal reaction does not efficiently proceed, it is possible that to the reaction solution is added an organic solvent having a good solubility for (i) to (iii).

Examples of the organic solvent include a hydrocarbon, a ketone, an ether, and an alcohol. A solvent that becomes vaporized during the hydrothermal reaction may lead to an insufficient progress of the hydrothermal reaction, and thus preferred are organic solvents having a boiling point under normal pressure of not lower than 120° C., more preferably not lower than 180° C., further preferably not lower than 210° C. Specific examples of such organic solvents include decane, dodecane, tetradecane, octanol, decanol, cyclohexanol, terpineol, ethylene glycol, diethylene glycol, 1,2-propanediol, 1,3-propanediol, 1,4-butanediol, 2,3-butanediol, hexanediol, glycerin, methane trimethylol, toluene, xylene, trimethylbenzene, dimethylformamide (DMF), dimethyl sulfoxide (DMSO), etc., with dodecane and tetradecane being preferable.

When the addition of an above-described organic solvent results in a separation into two layers, a surfactant or the like may be added to bring about a homogeneous phase state or a suspension/emulsion state, although a two-layer state can usually be subjected directly to a hydrothermal reaction.

The composition may contain a sufficient amount of water from a raw material(s). However, when there is no or little water contained in a raw material(s), it is necessary that water is added before the composition is subjected to the hydrothermal reaction.

The amount of water present in the hydrothermal reaction system is preferably form 4/1 to 100/1, more preferably form 8/1 to 50/1, in terms of the number of moles of the water relative to the number of moles of the metal oxide particles precursor present in the system (number of moles of the water/number of moles of the metal oxide particles precursor). When the water amount is below 4/1, the hydrothermal reaction may require a long time or lead to an increased particle size of the resulting nanoparticles. When the water amount is above 100/1, on the other hand, the hydrothermal reaction does not present any particular problems except that the productivity of the reaction is reduced due to a small amount of the metal oxide particles precursor present in the reaction system.

The hydrothermal reaction is preferably carried out at a pressure of not higher than 2 MPaG. The reaction proceeds also at pressures of not lower than 2 MPaG, while the reaction requires a more expensive reaction apparatus, which is not industrially preferable. Too low pressures, on the other hand, lead to slow progression of the hydrothermal reaction and as a result, the reaction takes a long period of time, which may result in an increased particle size of the nanoparticles or the metal oxide having more than one crystal system. Therefore, the reaction is preferably carried out at a pressure of not lower than 0.1 MPaG, more preferably not lower than 0.2 MPaG.

The reaction temperature is preferably adjusted so that the pressure within the reaction vessel is kept within an approximate range. In view of the saturated vapor pressure of the water contained in the composition, the reaction is preferably carried out at not higher than 200° C., more preferably not higher than 180° C. Since at low reaction temperatures, it may take a long period of time to carry out the reaction, the reaction is preferably carried out at not lower than 100° C., more preferably not lower than 120° C.

The atmosphere in the reaction vessel is preferably substituted with an inert gas such as nitrogen because side reactions due to oxidation and others of the organic carboxylic acid acid(s) and added organic solvent are suppressed. Incidentally, it is not preferable that the reaction system is pressurized to above normal pressure prior to heating, because pressurizing prior to heating leads to a higher pressure before the reaction system has arrived at a sufficient reaction temperature.

The reaction time can be set to an appropriate value, based on the relationship between the reaction temperature and pressure and the yield, and usually is from 0.1 to 50 hours, more preferably from 1 to 20 hours. Heating for more than 50 hours provides a small increase in the yield, and may result in an increased particle size of the metal oxide particles or the contained metal oxide having more than one crystal system.

The hydrothermal reaction usually leads to precipitation of a coated-metal-oxide-particles precursor coated with the second carboxylic acid compound at the bottom of the reaction vessel. The coated-metal-oxide-particles precursor can be purified to remove by-products, such as carbon, agglomerates of the coated-metal-oxide-particles precursor generated in the hydrothermal reaction, and others. For example, the coated-metal-oxide-particles precursor is obtained by filtering off the precipitated product, followed by dissolving it in a solvent (such as toluene) to remove insoluble materials and then removing the solvent (such as toluene) by concentration under reduced pressure or by other methods.

During the hydrothermal reaction, a basic compound is preferably used. The basic compound may be of any type which exhibits basicity when it is dissolved in water, and may be any of inorganic and organic compounds, without limitation to particular forms, including Bronsted bases and Lewis bases. Especially, the basic compound preferably is at least one basic compound selected from alkali metal salts, alkaline earth metal salts, and primary to tertiary amines, more preferably is a hydroxide of an alkali metal or alkaline earth metal, an alkali metal salt of a carboxylic acid, or an organic amine compound, and particularly preferably is a hydroxide of an alkali metal, or an organic amine compound. The presence of a basic compound results in an increased yield of the coated-metal-oxide-particles precursor generated. Furthermore, a wide range of kinds of carboxylic acids can be used as a raw material, thereby resulting in the production of a coated-metal-oxide-particles precursor coated with a kind of organic acid with which it is difficult to produce the precursor in conventional methods.

The amount of the basic compound preferably is not less than 0.03 mol and not more than 1.5 mol per mole of the metal oxide particles precursor used in this step. The addition of a basic compound in this range results in an enhanced improvement in the yield of the coated-metal-oxide-particles precursor.

Secondly, the displacement step to which a coated-metal-oxide-particles precursor is subjected will be described. Coated metal oxide particles of the present invention are obtained by displacing the second carboxylic acid compound on the coated-metal-oxide-particles precursor obtained by the hydrothermal reaction, with a first carboxylic acid compound. The displacement is performed, in particular, by stirring a mixture (particularly a mixture liquid) containing the coated-metal-oxide-particles precursor and the first carboxylic acid compound. The mass ratio between the first carboxylic acid compound and the coated-metal-oxide-particles precursor is not limited, and preferably is from 5/100 to 200/100, as expressed as a ratio of first carboxylic acid compound/coated-metal-oxide-particles precursor. At ratios below 5/100, the first carboxylic acid compound may be introduced in an insufficient amount, causing insufficient dispersibility. At ratios above 200/100, the amount of introduction of the first carboxylic acid compound onto the coated metal oxide particles may be saturated, leading to inefficiency. A more preferable ratio is from 10/100 to 150/100.

For the solvent that is used for the preparation of the mixture liquid, the solvent during the hydrothermal reaction can be employed as it is, or other solvents may be employed. Examples of solvents include alcohols such as methanol, ethanol, n-propanol, isopropanol, and ethylene glycol; ketones such as methyl ethyl ketone, methyl isobutyl ketone, and cyclohexanone; esters such as ethyl acetate, propyl acetate, propylene glycol monomethyl ether acetate, and methyl 3-methoxypropionate; ethers such as ethylene glycol monomethyl ether and diethylene glycol monobutyl ether; modified ethers such as propylene glycol monomethyl ether acetate (preference being given to ether-modified and/or ester-modified ethers, further preference being given to ether-modified and/or ester-modified alkylene glycols); hydrocarbons such as benzene, toluene, xylene, ethylbenzene, trimethylbenzene, hexane, cyclohexane, methylcyclohexane, ethylcyclohexane, and mineral spirit; halogenated hydrocarbons such as dichloromethane and chloroform; amides such as dimethylformamide, N,N-dimethylacetamide, N-methylpyrrolidone; water; and oils such as mineral oils, vegetable oils, wax oils, and silicone oils. When the coated metal oxide particles are prepared in such a solvent as mentioned above, the resulting coated metal oxide particles have improved affinity in the composition, and can prevent uneven dispersion to a greater extent.

The stirring temperature is preferably from 0 to 100° C., more preferably from 10 to 70° C., further preferably from 20 to 50° C. The concentration of the coated-metal-oxide-particles precursor in the mixture liquid is preferably from 5 to 80 mass %, and more preferably from 10 to 60 mass %. It is also possible that treatments are performed in the absence of any solvent or at a higher concentration, for example, using a ball mill. The reaction time is preferably from 10 minutes to 5 hours, more preferably from 20 minutes to 2 hours.

When coated metal oxide particles are prepared in a solvent, the coated metal oxide particles are preferably dissolved in the solvent. In this case, the coated metal oxide particles may be precipitated by addition of an appropriate poor solvent, for example, an aliphatic hydrocarbon solvent such as hexane. The precipitates can be separated from the solvent by an appropriate solid-liquid separation method, such as a filtration or centrifugation method. Also when dissolved in the solvent, the coated metal oxide particles can be separated from the solvent, for example, by concentration.

The coated metal oxide particles of the present invention obtained by the above-described method are preferably subjected to washing. Washing results in removal of by-products, unreacted first carboxylic acid compound, and displaced second carboxylic acid compound from the composition, whereby adverse effects due to these materials are eliminated when the composition is used in various applications described below. The washing solvent is not limited, and preferably used are acetone, hexane, heptane, octane, methanol, and ethanol.

<Treatments with Silane Coupling Agents>

According to the investigation by the present inventors, when the metal oxide particles have been subjected to surface treatment with a silane coupling agent, not only the initial transmittance is further improved, but also the transmittance is maintained longer. In the present invention, therefore, it is a more preferable embodiment that the metal oxide particles are subjected to surface treatment with a silane coupling agent.

Such a silane coupling agent preferably is a compound having a hydrolyzable group —Si—$OR^9$, wherein $R^9$ is a methyl group or an ethyl group. Examples of this type of silane coupling agent include silane coupling agents having a functional group, and alkoxysilanes.

Examples of a silane coupling agent having a functional group include a silane coupling agent represented by formula (3):

$$[X-(CH_2)_m]_{4-n}-Si-(OR^9)_n \quad (3)$$

wherein X denotes a functional group, $R^9$ is the same as above, m denotes an integer of 0 to 4, and n denotes an integer of 1 to 3.

Examples of X include a vinyl group, an amino group, a (meth)acryloxy group, a mercapto group, a glycidoxy group, etc. Specific examples of such silane coupling agents include silane coupling agents in which the functional group X is a vinyl group, such as vinyltrimethoxysilane and vinyltriethoxysilane; silane coupling agents in which the functional group X is an amino group, such as 3-aminopropyltrimethoxysilane, 3-aminopropyltriethoxysilane, N-2-(aminoethyl)-3-aminopropylmethyldimethoxysilane, and N-2-(aminoethyl)-3-aminopropylmethyltrimethoxysilane; silane coupling agents in which the functional group X is a (meth)acryloxy group, such as 3-acryloxypropyltrimethoxysilane, 3-methacryloxypropyltrimethoxysilane, 3-methacryloxypropyltriethoxysilane, 3-methacryloxypropylmethyldimethoxysilane, and 3-methacryloxypropylmethyldiethoxysilane; silane coupling agents in which the functional group X is a mercapto group, such as 3-mercaptopropyltrimethoxysilane, and 3-mercaptopropyltriethoxysilane; and silane coupling agents in which the functional group X is a glycidoxy group, such as 2-(3,4-epoxycyclohexyl)ethyltrimethoxysilane, 3-glycidoxypropyltrimethoxysilane, 3-glycidoxypropyltriethoxysilane, 3-glycidoxypropylmethyldimethoxysilane, and 3-glycidoxypropylmethyldiethoxysilane.

Examples of an alkoxysilane include alkoxysilanes containing an alkyl group in which the alkyl group is bonded directly to the silicon atom of the alkoxysilane, such as methyltrimethoxysilane, dimethyldimethoxysilane, trimethylmethoxysilane, propyltrimethoxysilane, butyltriethoxysilane, hexyltrimethoxysilane, hexyltriethoxysilane, octyltriethoxysilane, and decyltrimethoxysilane; and alkoxysilanes containing an aryl group in which the aromatic ring is bonded directly to the silicon atom of the alkoxysilane, such as phenyltrimethoxysilane, diphenyldimethoxysilane, and p-styryltrimethoxysilane.

As the silane coupling agent, preference is given especially to silane coupling agents in which the functional group X is a (meth)acryloxy group, and alkoxysilanes containing an alkyl group. Particular preference is given to 3-acryloxypropyltrimethoxysilane, 3-methacryloxypropyltrimethoxysilane, hexyltrimethoxysilane, octyltriethoxysilane, and decyltrimethoxysilane.

For the silane coupling agent, a single silane coupling agent may be used. Alternatively, two or more silane coupling agents may be used in combination. The amount of a silane coupling agent (to coat the particles) is preferably not less than 0.1 parts by mass, more preferably not less than 0.5 parts by mass, further more preferably not less than 2 parts by mass, more preferably not less than 4 parts by mass per 100 parts by mass of the entire metal oxide particles. High amounts of a silane coupling agent cause an increased cost and, in the case where the metal oxide is zirconium oxide, a decreased refractive index of the metal oxide particles. Therefore, the amount of a silane coupling agent usually is not more than 30 parts by mass, more preferably not more than 20 parts by mass, further preferably not more than 15 parts by mass, more preferably not more than 12 parts by mass per 100 parts by mass of the metal oxide particles.

When the metal oxide particles are coated with a silane coupling agent, the mass ratio of the silane coupling agent to the above-mentioned organic acid, that is, the silane coupling agent/organic acid (total amount of two or more organic acids when they are used for the particles to be coated therewith), is preferably from 0.1 to 2.0, more preferably from 0.2 to 1.5, further preferably from 0.3 to 0.95. If the amount of a silane coupling agent is within the mentioned range, an effect of increasing the dispersibility of the metal oxide particles is sufficiently exhibited.

When the metal oxide particles are coated both with an organic acid and a silane coupling agent, the time at which coating with the silane coupling agent is carried out is not limited. For example, it is possible that a dispersion liquid that is obtained by mixing the coated-metal-oxide particles precursor obtained by the hydrothermal reaction and the silane coupling agent and then subjecting the resulting mixture to a reaction under conditions at 65 to 100° C. for approximately 0.5 to 2 hours is used as a "mixture (mixture liquid) containing the coated-metal-oxide particles precursor and a first carboxylic acid compound" which is to be used as a raw material for the displacement step.

The particle diameter of the coated metal oxide particles that have been coated with the above-mentioned coating component(s) (an organic acid in some cases and a silane coupling agent in some cases) can be evaluated in terms of the average particle diameter obtained by processing of images from electron microscopies. The average particle diameter (average primary particle diameter) preferably is not more than 50 nm. By setting the average particle diameter of coated metal oxide particles to be not more than 50 nm, it is possible to increase the rate of transparency of a composition containing the coated metal oxide particles. The average primary particle diameter preferably is not more than 30 nm, further preferably not more than 20 nm. The lower limit of the average primary particle diameter usually is about 1 nm (particularly about 5 nm). The average particle diameter of metal oxide particles can be determined by subjecting them to magnification observation with a transmission electron microscope (TEM), a field-emission transmission electron microscope (FE-TEM), a field-emission scanning electron microscope (FE-SEM), or the like, selecting 100 particles at random, and measuring their longitudinal lengths, the arithmetic average of which is then calculated.

The concentration of metal oxide particles is not limited, and usually is from 20 to 90 mass % per 100 mass % of the dispersion, and preferably is from 50 to 80 mass % in view of the usefulness of dispersions and the dispersibility of particles.

<Dispersion>

Solvents that are used in a dispersion of the present invention need to allow coated metal oxide particles of the present invention to be sufficiently dispersed. Examples of such solvents include alcohols such as methanol, ethanol, n-propanol, isopropanol, and ethylene glycol; ketones such as methyl ethyl ketone, methyl isobutyl ketone, and cyclohexanone; esters such as ethyl acetate, propyl acetate, and propylene glycol monomethyl ether acetate; ethers such as ethylene glycol monomethyl ether and diethylene glycol monobutyl ether; modified ethers such as propylene glycol monomethyl ether acetate and methyl 3-methoxypropionate (preference being given to ether-modified and/or ester-modified ethers, further preference being given to ether-modified and/or ester-modified alkylene glycols); hydrocarbons such as benzene, toluene, xylene, ethylbenzene, trimethylbenzene, hexane, cyclohexane, methylcyclohexane, ethylcyclohexane, and mineral spirit; halogenated hydrocarbons such as dichloromethane and chloroform; amides such as dimethylformamide, N,N-dimethylacetamide, N-methylpyrrolidone; water; oils such as mineral oils, vegetable oils, wax oils, and silicone oils. Among these solvents, a single solvent can be selected and used, or two or more solvents can also be selected, mixed, and used. In terms of handling, suitable solvents have a boiling point under normal pressure of approximately not lower than 40° C. and not higher than 250° C. For resist applications described below, suitable solvents include ketones and modified ethers, with more preference being given to methyl ethyl ketone, methyl isobutyl ketone, propylene glycol monomethyl ether acetate, and methyl 3-methoxypropionate, and with further preference being given to methyl ethyl ketone or propylene glycol monomethyl ether acetate.

In a dispersion of the present invention, the coated metal oxide particles have a high compatibility with monomers (monofunctional monomers and/or cross-linkable monomers), and thus monomers can also be used as a dispersion medium.

Monofunctional monomers are compounds having a single polymerizable carbon-carbon double bond, and examples include (meth)acrylate esters; styrenic monomers such as styrene, p-tert-butylstyrene, α-methylstyrene, m-methylstyrene, p-methylstyrene, p-chlorostyrene, and p-chloromethylstyrene; monomers containing a carboxyl group such as (meth)acrylic acid; and monomers containing a hydroxy group such as hydroxyethyl (meth)acrylate. Specific examples of the above-mentioned (meth)acrylate esters include alkyl (meth)acrylate esters such as methyl (meth)acrylate, ethyl (meth)acrylate, n-propyl (meth) acrylate, n-butyl (meth) acrylate, isobutyl (meth) acrylate, tert-butyl (meth)acrylate, 2-ethylhexyl (meth)acrylate, and lauryl (meth)acrylate; cycloalkyl (meth)acrylate esters such as cyclohexyl (meth)acrylate and isobornyl (meth)acrylate; aralkyl (meth)acrylates such as benzyl (meth)acrylate; and (meth)acrylate esters containing a glycidyl group such as glycidyl (meth)acrylate, with methyl (meth)acrylate being particularly preferable. These illustrated monofunctional monomers may be used alone, or two or more of thereof may be mixed as appropriate and used.

Cross-linkable monomers are compounds having a plurality of carbon-carbon double bonds copolymerizable with the carbon-carbon double bond that monofunctional monomers contain. Specific examples of these cross-linkable monomers include multifunctional (meth)acrylates, such as alkylene glycol poly(meth)acrylates such as ethylene glycol di(meth)acrylate, diethylene glycol di(meth)acrylate, propylene glycol di(meth)acrylate, 1,6-hexanediol diacrylate, and dipropylene glycol di(meth)acrylate; neopentyl glycol poly(meth)acrylates such as neopentyl glycol di(meth)acrylate and dineopentyl glycol di(meth)acrylate; trimethylolpropane poly(meth)acrylates such as trimethylolpropane tri(meth)acrylate, ethoxylated (3) trimethylolpropane tri(meth)acrylate, propoxylated (3) trimethylolpropane tri(meth)acrylate, and ditrimethylolpropane tetra(meth)acrylate; and pentaerythritol poly(meth)acrylates such as pentaerythritol tetra(meth)acrylate and dipentaerythritol hexa(meth)acrylate; multifunctional styrenic monomers such as divinylbenzene; multifunctional allyl ester monomers such as diallyl phthalate, diallyl isophthalate, triallyl cyanurate, and triallyl isocyanurate; and 2-(2-vinyloxyethoxy)ethyl (meth)acrylate.

In addition, a dispersion of the present invention may be a resin composition comprising a polymer (resin) or both a polymer and a monomer.

When resin compositions are composed according to the present invention, examples of polymers that are a dispersion medium include polyamides such as 6-nylon, 66-nylon, and 12-nylon; polyimides; polyurethanes; polyolefins such as polyethylene and polypropylene; polyesters such as PET, PBT, and PEN; polyvinyl chlorides; polyvinylidene chlorides; polyvinyl acetates; polystyrenes; (meth)acrylic resin polymers; ABS resins; fluororesins; phenolic resins such as phenol-formalin resins and cresol-formalin resins; epoxy resins; and amino resigns such as urea resins, melamine resins, and guanamine resins. Also included are soft and hard resins such as polyvinyl butyral resins, polyurethane resins, ethylene-vinyl acetate copolymer resins, and ethylene-(meth)acrylate copolymer resins. Among the above-mentioned polymers, polyimides, polyurethanes, polyesters, (meth)acrylic resins, phenolic resins, amino resins, and epoxy resins are more preferable. These polymers may be used alone, or two or more thereof may be mixed and used.

A dispersion according to the present invention also has other additive components formulated thereinto, besides the coated metal oxide particles, and particular organophosphorus compound(s) and/or organosulfur compound(s), in ranges where the effects of the present invention are not impaired. Examples of such additive components include surfactants, curing agents, accelerators, coloring agents, internal release agents, coupling agents, reactive diluents, plasticizers, stabilizing agents, flame-retardant coagents, cross-linkers, shrinkage reducing agents, polymerization inhibitors, anti-oxidants, ultraviolet absorbers, anti-foaming agents, leveling agents, thixotropic agents, and thickeners. The amount of these additive components preferably is not more than 10 parts by mass, more preferably not more than 5 parts by mass, further preferably from 0 to 3 parts by mass relative to 100 parts by mass of the total amount of the coated metal oxide particles, organophosphorus compound(s) and/or organosulfur compound(s), and dispersion medium.

<Preferable Applications>

Dispersions comprising coated metal oxide particles of the present invention have remarkable dispersibility and storage stability and thus they can be used for a variety of applications typified by articles in which the dispersion has been subjected to molding or curing. Applications requiring a high degree of dispersibility include resist, optical, coating, and adhesion applications. Dispersions of the present invention are suitably used for optical lenses, cohesive agents for optical films, adhesives for optical films, resin compositions for nanoimprint lithography, microlens arrays, antireflective layers, films, and agents used for transparent electrodes, surface coats of optical lenses, light extraction layers of organic EL devices, various hard coat materials, flattening films for TFTs, overcoats for color filters, various protective films such as antireflection films, and optical materials such as optical filters, insulation films for touch sensors, insulation films for TFTs, photo spacers for color filters, and protective films for touch panels. In particular, coated metal oxide particles of the present invention have high refractive index, high hardness, and high stability, in addition to remarkable dispersibility, and thus are preferably used in optical lenses, surface coats of optical lenses, various hard coat materials, insulation films for touch sensors, insulation films for TFTs, and protective films for touch panels.

Furthermore, coated metal oxide particles of the present invention can be applied to gate insulation films of semiconductor devices, and capacitor insulation films for memories such as DRAMs, besides optical applications, taking advantage of their high dielectric constant. As methods for obtaining these insulation films with a high dielectric constant, there are known methods in which an insulation film is deposited by a vapor-phase growth process such as a CVD (Chemical Vapor Deposition) or ALD (Atomic Layer Deposition) process using an organometallic precursor, and then subjected to oxidation treatment. To obtain metal oxides with a desired high dielectric constant, treatments at high temperature of not lower than 600° C. are required. However, effects arising from these treatments result in phenomena causing operation destabilization of semiconductor layers, including pinning phenomena. The coated metal oxide particles of the present invention are a few nanometer-sized single particles that do not require any high-temperature treatment, and they already have a high dielectric constant at the production stage. Therefore, the coated metal oxide particles of the present invention can be layered so as to be suited for future semiconductor miniaturization, and at the same time, can be applied to production of semiconductors on plastic substrates because high-temperature treatments are not required.

The present application claims the benefit of priority of Japanese Patent Application No. 2014-011636, filed Jan. 24, 2014. The entire contents of the specification of Japanese Patent Application No. 2014-011636, filed Jan. 24, 2014, are incorporated herein for reference.

EXAMPLES

Although the present invention is now described in a more specific manner with reference to Examples, the present invention should not be limited by Examples which follow, but of course can be practiced with suitable modifications in the scope in accordance with the spirit described above and below, any of which modifications is included in the technical scope of the present invention.

The physical properties and characteristics disclosed in Examples were measured by the procedures described below.

(1) Analysis of Crystal Structures

The crystal structures of zirconium oxide particles were analyzed using an X-ray diffractometer (manufactured by Rigaku Corporation; RINT-TTR III). Measurement conditions were as follows:

X-ray source: CuKα (0.154 nm)
X-ray power setting: 50 kV, 300 mA
Sampling width: 0.0200°
Scan speed: 10.00000/min
Measurement range: 10 to 75°
Measurement temperature: 25° C.

(2) Determination of the Percentages of Tetragonal and Monoclinic Crystals

Quantitative determination was made by a Reference Intensity Ratio (RIP) method with calculation software (manufactured by Rigaku Corporation; PDXL), based on the values calculated using an X-ray diffractometer (manufactured by Rigaku Corporation; RINT-TTR III). (Assignment of peaks was done as specified by the calculation software.)

(3) Calculation of the Crystallite Size by X-Ray Diffraction Analysis

The crystallite size of zirconium oxide particles was calculated using calculation software (manufactured by Rigaku Corporation; PDXL), based on the width at half height of the peak at 30° analyzed and calculated by an X-ray diffractometer (manufactured by Rigaku Corporation; RINT-TTR III).

(4) Determination of the Average Primary Particle Diameter with an Electron Microscope The average primary particle diameter of coated zirconium oxide particles was determined by an ultra-high resolution field-emission scanning electron microscope (manufactured by Hitachi High-Technologies Corporation; S-4800). Coated zirconium oxide particles were observed at a magnification of 150,000×, and 100 particles selected at random were measured for the respective longitudinal lengths, of which the average value was taken as the average primary particle diameter.

(5) Determination of the Weight (Mass) Decrease Percentage

Coated zirconium oxide particles were subjected to temperature increase from room temperature to 800° C. at 10° C./min under an air atmosphere with a TG-DTA (thermogravimetry-differential thermal analysis) apparatus, to determine the weight (mass) decrease percentage of the particles. The weight (mass) decrease percentage allows one to obtain the percentage of the carboxylate compound on the metal oxide particles coated therewith and the percentage of the metal oxide particles.

(6) $^1$H-NMR Measurement

Coated zirconium oxide particles were dispersed in deuterated chloroform to prepare a measurement sample, which was then subjected to measurement using a Variann "Unity Plus" (resonance frequency: 400 MHz, number of accumulations: 16). Molar ratios of respective compounds were determined based on the integration ratios of peaks at the below-indicated chemical shifts (relative to tetramethylsilane).

i) 2-ethylhexanoic acid (1.0-0.5 ppm: 6H)
ii) carboxylate from 2-ethylhexanoic acid (1.0-0.5 ppm: 6H)
iii) 2-acryloyloxyethyl succinate (6.7-5.7 ppm: 3H, 4.5-4.0 ppm: 4H)
iv) 3-methacryloxypropyltrimethoxysilane (6.5-5.5 ppm: 2H, 4.5-4.0 ppm: 2H, 4.0-3.5 ppm: 9H, 1.0-0.5 ppm: 2H)

(7) Fluorescent X-Ray Analysis

A fluorescent X-ray analysis apparatus (ZSX Primus II, manufactured by Rigaku Corporation) was used to determine the contents of Zr and Si in coated zirconium oxide particles.

(8) Evaluation of Transparency

A PET film with a thickness of 100 microns (trade name: COSMOSHINE AS4300, manufactured by Toyobo Co., Ltd.) was coated with a composition detailed below, using a bar coater #20. Subsequently, the PET film was dried at 80° C. for 5 minutes and then cured by irradiation with 1000 mJ/cm$^2$ of ultraviolet radiation using a high-pressure mercury lump, to obtain a cured material (having a dry film thickness of 5 microns). The haze in the direction of thickness of the prepared cured material was measured using a turbidimeter (NDH 5000, manufactured by NIPPON DENSHOKU INDUSTRIES CO., LTD.).

○ (open circle): not more than 1%, Δ (open triangle): 1%-50%, x (cross): not lower than 50%

(9) Evaluation of Storage Stability

Changes over time in the transmittance of the dispersion liquids detailed below at 40° C. were measured using a turbidimeter (NDH 5000, manufactured by NIPPON DENSHOKU INDUSTRIES CO., LTD.). The following indicators were used as items for evaluation of storage stability:

"Initial transmittance" is an evaluation item related to the transmittance immediately after the preparation of the dispersion liquid (initial value).

⊙ (double circle): an initial value of not lower than 60%,
○ (open circle): an initial value of not lower than 50% and less than 60%

"Transmittance lasting rate" is an indicator indicating the change in the transmittance of a dispersion liquid when the dispersion liquid has been subjected to aging. When the transmittance immediately after the preparation of the dispersion liquid (initial value) is expressed as $L_0$ and the transmittance 2 weeks after the preparation is expressed as $L_{2week}$, the transmittance lasting rate is determined by the following equation:

Transmittance lasting rate (%)=${(L_0-L_{2week})/L_0}×100$

⊙ (double circle): a transmittance lasting rate of not higher than 5%, ○ (open circle): a transmittance lasting rate of more than 5%, Δ (open triangle): gel formation not observed after 1 week, but observed after 2 weeks, x (cross): gel formation observed after 1 week.

Production Example 1

Production of Coated Zirconium Oxide Nanoparticles (Coated $ZrO_2$ Particles) Coated with 2-Ethylhexanoic Acid and/or Carboxylate Derived Therefrom Pure water (268 g) was mixed into a solution of zirconium 2-ethylhexanoate in mineral spirit (782 g, with a content of zirconium 2-ethylhexanoate of 44 mass %, manufactured by Daiichi Kigenso Kagaku Kogyo Co., Ltd.). The resulting mixture was charged into an autoclave equipped with a stirrer, and then the atmosphere in the autoclave was substituted with nitrogen gas. Then, the mixture was heated to 180° C., which was kept for 16 hours (the pressure within the autoclave was 0.94 MPa) to carry out the reaction to produce zirconium oxide particles. Subsequently, the mixture after the reaction was removed, and the precipitate that had deposited at the bottom was filtered off, washed with acetone, and then dried. The dried precipitate (100 g) was dispersed in toluene (800 mL), resulting in a cloudy solution. Then, as a purification step, the cloudy solution was again filtered through a quantitative filter paper (manufactured by Advantec Toyo Kaisha, Ltd.; No. 5C) to remove large particles and others in the precipitate. Further, the filtrate was concentrated under reduced pressure to remove the toluene, thereby to collect white zirconium oxide nanoparticles (coated $ZrO_2$ particles).

When the crystal structure of the resulting coated $ZrO_2$ particles was identified, diffraction lines attributed to tetragonal and monoclinic crystals were detected. The strengths of the diffraction lines revealed that the ratio of tetragonal crystals to monoclinic crystals was 54/46 and their particle diameter (crystallite size) was 5 nm.

The average particle diameter (average primary particle diameter) of the coated $ZrO_2$ particles, which was obtained by electron microscope measurement, was 12 nm. When the resulting coated $ZrO_2$ particles were analyzed by infrared absorption spectrum, absorptions from C—H and COOH were able to be identified. These absorptions are attributable to the 2-ethylhexanoic acid and/or carboxylate derived therefrom on the coated zirconium oxide particles coated therewith.

Furthermore, the weight decrease percentage of the coated $ZrO_2$ particles, which was measured according to the above-described section "(5) Determination of the weight decrease percentage", was 12 mass %. Accordingly, it turned out that the amount of the 2-ethylhexanoic acid and/or carboxylate derived therefrom with which the coated zirconium oxide particles were coated was 12 mass % of the entire coated zirconium oxide particles.

Production Example 2

Production of Zirconium Oxide Nanoparticles Coated with 2-Ethylhexanoic Acid and/or Carboxylate Derived Therefrom and 2-Acryloyloxyethyl Succinate (Coated $ZrO_2$ Particles 1)

The coated zirconium oxide nanoparticles (10 g) obtained in Production Example 1 and 2-acryloyloxyethyl succinate (1.5 g) were mixed in propylene glycol monomethyl ether acetate (12 g; referred to hereinafter as "PGMEA") with stirring until a homogeneous dispersion was formed. Then, n-hexane (36 g) was added to agglomerate the dispersed particles, turning the solution cloudy. The agglomerated particles were separated from the cloudy solution by a filter paper. Then, the separated agglomerated particles were added into n-hexane (36 g) and the mixture was stirred for 10 minutes. After that, the agglomerated particles were separated by a filter paper. The particles obtained were dried under vacuum at room temperature to prepare zirconium oxide nanoparticles that had been surface-treated with 2-ethylhexanoic acid and/or carboxylate derived therefrom and 2-acryloyloxyethyl succinate (coated $ZrO_2$ particles 1).

The resulting coated $ZrO_2$ particles 1 were dispersed in deuterated chloroform to prepare a measurement sample, which was then subjected to $^1$H-NMR analysis. From the results, it turned out that the molar ratio of presence of the 2-ethylhexanoic acid and/or carboxylate derived therefrom to the 2-acryloyloxyethyl succinate was 24:76.

Furthermore, the weight decrease percentage of the coated $ZrO_2$ particles 1, which was measured according to the above-described section "(5) Determination of the weight decrease percentage", was 18 mass %. Accordingly, it turned out that the amount of the 2-ethylhexanoic acid and/or carboxylate derived therefrom and the 2-acryloyloxyethyl succinate on the coated zirconium oxide particles coated therewith was 18 mass % of the entire coated zirconium oxide particles.

Example 1

The coated $ZrO_2$ particles 1 (7 g) obtained in Production Example 2, methyl ethyl ketone (3 g), DISPERBYK-111 (manufactured by BYK Japan KK; 0.14 g) were mixed together, and the mixture was homogeneously stirred to give an inorganic-oxide-particulates-containing solution.

Comparative Example 1

The coated $ZrO_2$ particles 1 (7 g) obtained in Production Example 2, and methyl ethyl ketone (3 g) were mixed together, and the mixture was homogeneously stirred to give a comparative inorganic-oxide-particulates-containing solution.

Production Example 3

Production of Zirconium Oxide Nanoparticles Coated with 2-Ethylhexanoic Acid and/or Carboxylate Derived Therefrom, 2-Acryloyloxyethyl Succinate, and 3-Methacryloxypropyltrimethoxysilane (Coated $ZrO_2$ Particles 2)

The coated zirconium oxide nanoparticles (10 g) obtained in the above-described Production Example 1 were dispersed in methyl isobutyl ketone (40 g) to prepare a cloudy slurry. To the solution were added 3-methacryloxypropyltrimethoxysilane (2.0 g; manufactured by Shin-Etsu Chemical Co., Ltd.; KBM-503) as a surface-treatment agent and water (0.9 g). The mixture was heated to reflux at 80° C. for 1 hour to give a clear dispersion solution. Then, the temperature of the solution was allowed to decrease to 50° C. After that, 2-acryloyloxyethyl succinate (1.8 g) was added and the mixture was mixed with stirring for 30 minutes. Then, n-hexane was added to agglomerate the dispersed particles, turning the solution cloudy. The agglomerated particles were separated from the cloudy solution by a filter paper and dried by heating at room temperature to prepare zirconium oxide nanoparticles coated with 2-ethylhexanoic acid and/or carboxylate derived therefrom, 2-acryloyloxyethyl succinate, and 3-methacryloxypropyltrimethoxysilane (coated $ZrO_2$ particles 2).

The resulting coated $ZrO_2$ particles 2 were subjected to temperature increase to 800° C. at a rate of 10° C./min under an air atmosphere by TG-DTA (thermogravimetry-differential thermal analysis) to determine the weight decrease percentage of the coated zirconium oxide nanoparticles. As a result, the weight decrease percentage was 17 mass %. From the result, it was ascertained that the organic content in the coated zirconium oxide nanoparticles was 17 mass %.

In addition, the coated zirconium oxide nanoparticles were analyzed by a fluorescent X-ray analysis apparatus to determine the contents of Zr and Si. As a result, the amount of 3-methacryloxypropyltrimethoxysilane was found to be 8 mass % relative to the coated zirconium oxide.

The resulting coated $ZrO_2$ particles 2 were dispersed in deuterated chloroform to prepare a measurement sample, which was then subjected to $^1$H-NMR analysis. From the results, it turned out that the molar ratio of presence among the 2-ethylhexanoic acid and/or carboxylate derived therefrom, the 3-methacryloxypropyltrimethoxysilane, and the 2-acryloyloxyethyl succinate was 27:35:38.

Judging from the above-described analytical results obtained by TG-DTA, fluorescent X-ray analysis, and $^1$H-NMR, it turned out that the 2-ethylhexanoic acid and/or carboxylate derived therefrom, the 3-methacryloxypropyltrimethoxysilane, and the 2-acryloyloxyethyl succinate were present in amounts of 3 mass %, 8 mass %, and 7 mass %, respectively, in the entire coated zirconium oxide particles (100 mass %).

Example 2

The coated $ZrO_2$ particles 2 (7 g) obtained in Production Example 3, propylene glycol monomethyl ether acetate (3 g), and DISPERBYK-111 (0.14 g) were mixed together, and the mixture was homogeneously stirred to give an inorganic-oxide-particulates-containing solution 2.

Comparative Example 2

The coated $ZrO_2$ particles 2 (7 g) obtained in Production Example 3, and propylene glycol monomethyl ether acetate (3 g) were mixed together, and the mixture was homogeneously stirred to give a comparative inorganic-oxide-particulates-containing solution 2.

Example 3 to 15 and Comparative Example 3

The type and addition amount of each of the components constituting a dispersion were changed as indicated in the tables below. The components shown in the tables were as described below. In the tables, the amounts of addition of organophosphorus compound/organosulfur compound, silane coupling agent, and organic acid are indicated in mass ratio (%) relative to the $ZrO_2$ particles.

[Organophosphorus Compound/Organosulfur Compound]

[Chemical Formula 32]

BYK-111: 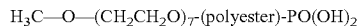

TEGO655: 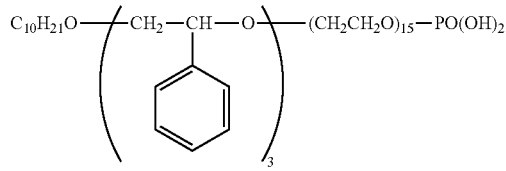

PM-21: 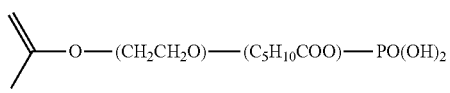

NF-08 (Acid-treated product): 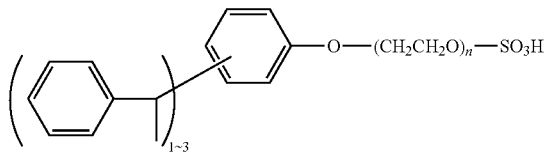

SR-10 (Acid-treated product): 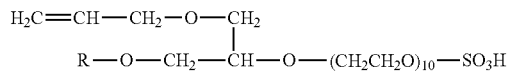

SR-30 (Acid-treated product): 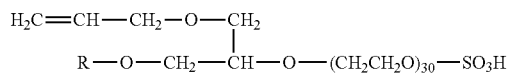

[Chemical Formula 32]

A-208: $(C_8H_{17}O)_2$—POOH
A-8: $C_8H_{17}O$—PO(OH)$_2$
EHD-400: $C_8H_{17}O$—(CH$_2$CH$_2$O)$_2$—PO(OH)$_2$
1000-FCP: $C_8H_{17}O$—(CH$_2$CH$_2$(CH$_2$)O)$_2$—PO(OH)$_2$

DBS:

$C_{12}H_{25}$—⟨benzene ring⟩—SO$_3$H

In the table above, the detail of each of the compound is as follows. Any of the organophosphorus compounds BYK-111, TEGO 655, PM-21, A-208, A-8, EHD-400, and 1000-FCP is a mixture of a phosphate monoester and a phosphate diester, of which the main component compound is shown in the table.

BYK-111: DISPERBYK-111 (in the table, the structure of the polyester chain in the formula is not open to the public; manufactured by BYK Japan KK)

TEGO 655: TEGO (registered trademark) Dispers 655 (manufactured by Evonik)

PM-21: KAYAMER PM-21 (manufactured by Nippon Kayaku Co., Ltd.)

NF-08: a hydrochloric acid-treated product of HITENOL NF-08 (in the table, the value of n in the formula is not open to the public; manufactured by Dai-ichi Kogyo Seiyaku Co., Ltd.)

SR-10: a hydrochloric acid-treated product of ADEKA REASOAP SR-10 (in the table, the structure of R in the formula is not open to the public; manufactured by ADEKA CORPORATION)

SR-30: a hydrochloric acid-treated product of ADEKA REASOAP SR-30 (in the table, the structure of R in the formula is not open to the public; manufactured by ADEKA CORPORATION)

A-208: Phoslex A-208 (manufactured by SC Organic Chemical Co., Ltd.)

A-8: Phoslex A-8 (manufactured by SC Organic Chemical Co., Ltd.)

EHD-400: Antox EHD-400 (manufactured by Nippon Nyukazai Co., Ltd.)

1000-FCP: Newcol 1000-FCP (manufactured by Nippon Nyukazai Co., Ltd.)

DBS: Dodecylbenzenesulfonic Acid (manufactured by TCI)

[Silane Coupling Agents]

Methacryl: 3-methacryloxypropyltrimethoxysilane (manufactured by Shin-Etsu Chemical Co., Ltd.; KBM-503)

n-Decyl: n-decyltrimethoxysilane (manufactured by Shin-Etsu Chemical Co., Ltd.; KBM-3103)

[Organic Acids]

HOA-MS: 2-acryloyloxyethyl succinate
CEA: carboxyethyl acrylate

[Dispersion Media]

MEK: methyl ethyl ketone
PGMEA: propylene glycol monomethyl ether acetate

<Evaluation of the Compatibility with Monomers>

For each of the inorganic-oxide-particulates-containing solutions obtained in Examples 1 to 15 and the comparative inorganic-oxide-particulates-containing solutions obtained in Comparative Examples 1 to 3, a brown glass bottle was charged with 10.0 g of the solution, 7.0 g of a monomer described in table 1, 18.0 g of methyl ethyl ketone, and 0.2 g of Irgacure 184 (a photoradical polymerization initiator, manufactured by BASF). The mixture was stirred until the homogeneous solution was formed, to obtain an inorganic-oxide-particulates-containing composition.

The resulting inorganic-oxide-particulates-containing composition was subjected to evaluation of transparency as described in the section (8) Evaluation of transparency. The results are shown in Tables 1 to 2. The monomers that were used are as follows.

3PO-TMPTA: propoxylated(3) trimethylolpropane triacrylate (trade name: SR492, manufactured by Sartomer)

3EO-TMPTA: ethoxylated(3) trimethylolpropane triacrylate (trade name: SR454, manufactured by Sartomer)

1,6-HXDA: 1,6-hexanediol diacrylate

TMPTA: trimethylolpropane triacrylate

DPHA: dipentaerythritol hexaacrylate

DTMPTEA: dimethylolpropane tetraacrylate

PETA: pentaerythritol triacrylate

VEER: 2-(2-vinyloxyethoxy)ethyl acrylate

As shown in the tables, it can be found that even in the case of monomers exhibiting no compatibility with the monomers, the compatibility with the monomers was improved by the addition of the organophosphorus compounds to the dispersion containing the coated zirconium oxide particles.

<Evaluation of Storage Stability>

The results of evaluation of the storage stability at 40° C. for each of the inorganic-oxide-particulates-containing solutions obtained in Examples 1 to 15, and the comparative inorganic-oxide-particulates-containing solutions obtained in Comparative Examples 1 to 3 are shown in Tables 1 to 2 and in FIG. 1.

The coated zirconium oxide particles containing the organophosphorus compound had an increased initial transmittance 69%, which is higher than 58% by as much as about 11%, in comparison between Example 1 using the coated zirconium oxide particles that had been subjected to surface treatment with 2-ethylhexanoic acid and/or carboxylate derived therefrom and 2-acryloyloxyethyl succinate, and Comparative Example 1. In addition, it is found that the transmittance lasting rate was improved from x (cross) to Δ (open triangle) and the solution can be used without gel formation, even after a period of more than 1 week.

In Examples 2 to 15, the transmittances of the solutions had, even after the lapse of 3 weeks, a value slightly inferior to or comparable to the initial value, by surface treatment of the coated zirconium oxide particles with a silane coupling agent such as 3-methacryloxypropyltrimethoxysilane or decyltrimethoxysilane, in addition to 2-ethylhexanoic acid and/or carboxylate derived therefrom and 2-acryloyloxyethyl succinate. This result is surprising in that in comparison with Example 1, the transmittance lasting rate was significantly improved.

TABLE 1

|  |  | Example 1 | Comparative Example 1 | Example 2 | Example 3 | Example 4 | Example 5 | Example 6 | Example 7 | Example 8 | Example 9 | Comparative Example 2 |
|---|---|---|---|---|---|---|---|---|---|---|---|---|
| Organophosphorus compounds/ organosulfur compounds | BYK-111 | 2 |  | 2 |  |  |  |  |  | 2 |  |  |
|  | TEGO 655 |  |  |  | 2 |  |  |  |  |  | 2 |  |
|  | PM-21 |  |  |  |  | 2 |  |  |  |  |  |  |
|  | NF-08 |  |  |  |  |  | 2 |  |  |  |  |  |
|  | SR-10 |  |  |  |  |  |  | 2 |  |  |  |  |
|  | SR-30 |  |  |  |  |  |  |  | 2 |  |  |  |
|  | A-208 |  |  |  |  |  |  |  |  |  |  |  |
|  | A-8 |  |  |  |  |  |  |  |  |  |  |  |
|  | EDH-400 |  |  |  |  |  |  |  |  |  |  |  |
|  | 1000-FCP |  |  |  |  |  |  |  |  |  |  |  |
|  | DBS |  |  |  |  |  |  |  |  |  |  |  |
| Silane coupling agents | Methacryl |  |  | 20 | 20 | 20 | 20 | 20 | 20 |  | 10 | 20 |
|  | n-Decyl |  |  |  |  |  |  |  |  | 5 |  |  |
| Organic acids | HOA-MS | 10 | 15 | 10 | 10 | 10 | 10 | 10 | 10 | 20 |  | 10 |
|  | CEA |  |  |  |  |  |  |  |  |  | 30 |  |
| Dispersion media | MEK | 30 | 30 |  | 30 |  |  |  | 30 | 30 | 30 |  |
|  | PGMEA |  |  | 30 |  | 30 | 30 | 30 |  |  |  | 30 |
| Compatibility with monomers | 3PO-TMPTA | ○ | X | ○ | ○ | ○ | ○ | ○ | ○ | ○ | ○ | ○ |
|  | 3EO-TMPTA | ○ | ○ | ○ | ○ | ○ | ○ | ○ | ○ | ○ | ○ | X |
|  | 1,6-HXDA | ○ | ○ | ○ | ○ | ○ | ○ | ○ | ○ | ○ | ○ | ○ |
|  | TMPTA | ○ | ○ | ○ | ○ | ○ | ○ | ○ | ○ | ○ | ○ | ○ |
|  | DPHA | ○ | ○ | Δ | Δ | Δ | Δ | Δ | Δ | Δ | ○ | X |
|  | DTMPTEA | ○ | Δ | ○ | ○ | ○ | ○ | ○ | ○ | ○ | ○ | Δ |
|  | PETA | ○ | ○ | Δ | Δ | Δ | Δ | Δ | Δ | Δ | ○ | X |
|  | VEEA | — | — | ○ | — | — | — | — | — | — | — | — |
| Storage stability | Initial value | 69% | 58% | 68% | 65% | 62% | 60% | 60% | 63% | 68% | 65% | — |
|  | After 3 days | 65% | 41% | 68% | 65% | 61% | 60% | 60% | 63% | 67% | 63% | — |
|  | After 1 week | 62% | gel formation | 68% | 65% | 59% | 59% | 58% | 63% | 65% | 57% | — |
|  | After 2 weeks | gel formation | — | 68% | 65% | 57% | 57% | 57% | 63% | 63% | 47% | — |
|  | After 3 weeks | — | — | 68% | 65% | 54% | 56% | 56% | 63% | 61% | 30% | — |
|  | Initial transmittance rate | ◎ | ○ | ◎ | ◎ | ◎ | ◎ | ◎ | ◎ | ◎ | ◎ | — |
|  | Transmittance lasting rate | Δ | X | ◎ | ◎ | ○ | ○ | ○ | ◎ | ○ | ○ | — |

TABLE 2

|  |  | Example 10 | Example 11 | Example 12 | Example 13 | Example 14 | Example 15 | Comparative Example 3 |
|---|---|---|---|---|---|---|---|---|
| Organophosphorus compounds/ organosulfur compounds | BYK-111 |  |  |  |  |  |  |  |
|  | TEGO 655 |  |  |  |  |  |  |  |
|  | PM-21 |  |  |  |  |  | 10 |  |
|  | NF-08 |  |  |  |  |  |  |  |
|  | SR-10 |  |  |  |  |  |  |  |
|  | SR-30 |  |  |  |  |  |  |  |
|  | A-208 | 2 |  |  |  |  |  |  |
|  | A-8 |  | 2 |  |  |  |  |  |
|  | EDH-400 |  |  | 2 |  |  |  |  |
|  | 1000-FCP |  |  |  | 2 |  |  |  |
|  | DBS |  |  |  |  | 2 |  |  |
| Silane coupling agents | Methacryl | 10 | 10 | 10 | 10 | 10 | 10 | 10 |
|  | n-Decyl |  |  |  |  |  |  |  |
| Organic acids | HOA-MS | 15 | 15 | 15 | 15 | 15 | 15 | 15 |
|  | CEA |  |  |  |  |  |  |  |
| Dispersion media | MEK |  | 30 |  |  |  | 30 | 30 |
|  | PGMEA | 30 |  | 30 | 30 | 30 |  |  |
| Compatibility with monomers | 3PO-TMPTA | Δ | Δ | ○ | ○ | ○ | ○ | X |
|  | 1,6-HXDA | ○ | ○ | ○ | ○ | ○ | ○ | ○ |
|  | TMPTA | ○ | ○ | ○ | ○ | ○ | ○ | ○ |
|  | DTMPTEA | Δ | Δ | ○ | ○ | ○ | ○ | Δ |

TABLE 2-continued

|  |  | Example 10 | Example 11 | Example 12 | Example 13 | Example 14 | Example 15 | Comparative Example 3 |
|---|---|---|---|---|---|---|---|---|
| Storage stability | Initial value | 58% | 58% | 59% | 59% | 59% | 66% | — |
|  | After 3 days | 57% | 58% | 59% | 59% | 59% | 66% | — |
|  | After 1 week | 54% | 56% | 58% | 59% | 57% | 66% | — |
|  | After 2 weeks | 60% | 54% | 57% | 59% | 55% | 66% | — |
|  | After 3 weeks | 45% | 53% | 56% | 58% | 54% | 65% | — |
|  | Initial transmittance rate | ○ | ○ | ○ | ○ | ○ | ◎ | — |
|  | Transmittance lasting rate | ○ | ○ | ◎ | ◎ | ○ | ◎ | — |

The invention claimed is:

1. A dispersion, comprising:
   metal oxide particles with an average primary particle diameter of not more than 50 nm;
   an organic acid;
   a dispersion medium; and
   an organophosphorus compound, or a salt thereof, represented by formula (1):

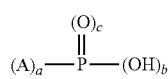 (1)

wherein a and b are each independently 1 or 2, with a+b being equal to 3, and c is 0 or 1;
A denotes a substituent comprising a substituent represented by the below-mentioned formula (a1) and at least one of the linker groups represented by the below-mentioned formulae (a2), wherein the below-mentioned formulae (a2) is bonded to the phosphorus atom via the oxygen atom:

$R^1-(O)_t-$ (a1)

wherein $R^1$ denotes a saturated or unsaturated hydrocarbon group with 1 to 50 carbon atoms, a (meth)acryloyl group, or an aromatic group-containing hydrocarbon group with 6 to 100 carbon atoms, and t is 0 or 1;

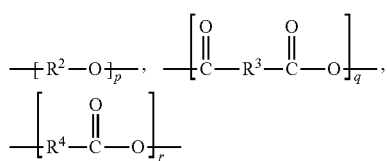 (a2)

wherein $R^2$, $R^3$, and $R^4$ are a divalent hydrocarbon group with 1 to 18 carbon atoms, or a divalent aromatic group-containing hydrocarbon group with 6 to 30 carbon atoms, and a hydrogen atom of each of the $R^2$, $R^3$, and $R^4$ is optionally substituted with an ether group;
p, q, and r each denote an integer molar ratio per mole of the unit (a1), with p+q+r being equal to from 1 to 200, p being equal to from 1 to 200, q being equal to from 1 to 200, and r being equal to from 1 to 200; and/or
an organosulfur compound, or a salt thereof, represented by formula (2):

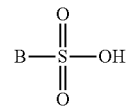 (2)

wherein B denotes a substituent comprising a substituent represented by the below-mentioned formula (b1) and at least one of the linker groups represented by the below-mentioned formulae (b2), wherein the below-mentioned formulae (b2) is bonded to the sulfur atom via the oxygen atom:

$R^5-(O)_t-$ (b1)

wherein $R^5$ denotes a saturated or unsaturated hydrocarbon group with 1 to 50 carbon atoms, a (meth)acryloyl group, or an aromatic group-containing hydrocarbon group with 6 to 100 carbon atoms, and t is 0 or 1;

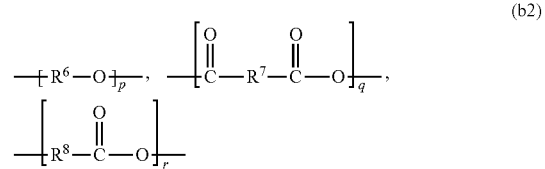 (b2)

wherein $R^6$, $R^7$, and $R^8$ are a divalent hydrocarbon group with 1 to 18 carbon atoms, or a divalent aromatic group-containing hydrocarbon group with 6 to 30 carbon atoms, and a hydrogen atom of each of the $R^6$, $R^7$, and $R^8$ is optionally substituted with an ether group;
p, q, and r each denote an integer molar ratio per mole of the unit (b1), with p+q+r being equal to from 1 to 200, p being equal to from 1 to 200, q being equal to from 1 to 200, and r being equal to from 1 to 200.

2. The dispersion according to claim 1, wherein the metal oxide particles are coated with at least a part of the organic acid.

3. The dispersion according to claim 1, wherein the metal of the metal oxide particles is at least one selected from Ti, Al, Zr, Zn, Sn, and Ce.

4. The dispersion according to claim 1, wherein the organic acid is an organic acid selected from (meth)acrylic acids, or carboxylic acids with one or more substituents selected from the group consisting of an ester group, an ether group, an amido group, a thioester group, a thioether group, a carbonate group, a urethane group, and a urea group.

5. The dispersion according to claim 1, wherein the organic acid is a half ester of a $C_{3-9}$ aliphatic dicarboxylic acid with a (meth)acryloyloxy $C_{1-6}$ alkyl alcohol.

6. The dispersion according to claim 1, wherein the metal oxide particles have been subjected to surface treatment with a silane coupling agent.

7. An article produced by molding or curing the dispersion according to claim 1.

* * * * *